(12) United States Patent
Fujimori

(10) Patent No.: US 10,721,677 B2
(45) Date of Patent: Jul. 21, 2020

(54) COMMUNICATION APPARATUS, CONTROL METHOD, AND RECORDING MEDIUM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/175,552

(22) Filed: Oct. 30, 2018

(65) Prior Publication Data

US 2019/0132785 A1 May 2, 2019

(30) Foreign Application Priority Data

Oct. 31, 2017 (JP) ................................. 2017-211159

(51) Int. Cl.
| | |
|---|---|
| *H04W 48/10* | (2009.01) |
| *H04W 48/18* | (2009.01) |
| *H04W 48/20* | (2009.01) |
| *H04W 8/00* | (2009.01) |
| *H04W 48/16* | (2009.01) |
| *H04W 84/18* | (2009.01) |
| *H04W 84/12* | (2009.01) |

(52) U.S. Cl.
CPC ........... *H04W 48/10* (2013.01); *H04W 8/005* (2013.01); *H04W 48/16* (2013.01); *H04W 48/18* (2013.01); *H04W 48/20* (2013.01); *H04W 84/12* (2013.01); *H04W 84/18* (2013.01)

(58) Field of Classification Search
CPC ..................................................... H04W 48/10
USPC ......................................................... 370/328
See application file for complete search history.

(56) References Cited

U.S. PATENT DOCUMENTS

| | | | |
|---|---|---|---|
| 2015/0036540 A1 | 2/2015 | Kasslin | |
| 2015/0131529 A1* | 5/2015 | Zhou | H04W 84/18 370/328 |
| 2015/0200811 A1* | 7/2015 | Kasslin | H04L 41/12 370/254 |
| 2016/0286476 A1* | 9/2016 | Patil | H04W 40/32 |
| 2016/0345242 A1* | 11/2016 | Kim | H04W 48/16 |
| 2016/0353269 A1* | 12/2016 | Kasslin | H04W 8/005 |
| 2017/0347255 A1* | 11/2017 | Liu | H04W 76/10 |
| 2018/0027487 A1* | 1/2018 | Pang | H04W 48/16 370/338 |
| 2019/0124611 A1* | 4/2019 | Pang | H04W 56/00 |
| 2019/0132785 A1* | 5/2019 | Fujimori | H04W 48/10 |
| 2019/0132791 A1* | 5/2019 | Fujimori | H04W 48/18 |

* cited by examiner

*Primary Examiner* — Peter G Solinsky
(74) *Attorney, Agent, or Firm* — Canon U.S.A., Inc. IP Division

(57) ABSTRACT

A communication apparatus is provided and is capable of selecting between a mode in which a service notification is issued in a single network (NW) and a mode in which a service notification is issued in a plurality of NWs selects which mode to issue a service notification based on a predetermined condition, and issues a service notification based on the selected mode.

20 Claims, 13 Drawing Sheets

COMMUNICATION APPARATUS, CONTROL METHOD, AND RECORDING MEDIUM

BACKGROUND

Field

The present disclosure relates to a service notification of a communication apparatus.

Description of the Related Art

The Wi-Fi Alliance has drawn up the Wi-Fi Neighbor Awareness Network (NAN) standard in recent years. The Wi-Fi NAN standard is a communication standard capable of, with saved power, detecting other communication apparatuses and issuing a notification of a service or services that the own device provides. According to the Wi-Fi NAN standard, communication apparatuses that perform communication compliant with the Wi-Fi NAN standard (hereinafter, NAN devices) synchronously transmit and receive predetermined signals with each other in a predetermined period. The predetermined period in which NAN devices transmit and receive predetermined signals with each other is referred to as a Discovery Window (DW). A network constituted by NAN devices sharing a DW is referred to as a NAN cluster. A NAN device can notify other NAN devices joining the same NAN cluster of the service(s) that the own device provides, by transmitting and receiving signals to/from the other NAN devices.

A Cluster Grade (CG) is set for each NAN cluster. A NAN device joins a NAN cluster having a higher CG. The Wi-Fi NAN standard defines that when a NAN device detects a NAN cluster having a CG higher than that of the NAN cluster which the own device already joins, the NAN device joins the detected NAN cluster.

United States Patent Publication Application No. 2015/0036540 discusses determining a NAN cluster to be joined based on a predetermined condition when a NAN device joining a NAN cluster detects a plurality of other NAN clusters.

When there is a plurality of NAN clusters and a NAN device joins a single NAN cluster, the NAN device cannot notify other NAN devices joining the NAN cluster(s) which the NAN device does not join, of the service(s) that the own device provides. However, there is an advantage that the power consumption of the NAN device is suppressed since the NAN device only needs to transmit and receive signals in the DW of the single NAN cluster which the NAN device joins.

On the other hand, when there is a plurality of NAN clusters and a NAN device joins the plurality of NAN clusters, the NAN device needs to transmit and receive signals in the DW of each of the NAN clusters. This disadvantageously increases the power consumption. However, there is an advantage that the NAN device can issue, in the plurality of NAN clusters, a notification of the service(s) that the own device provides.

SUMMARY

The present disclosure is directed to providing a communication apparatus which, when there is a plurality of networks (NWs), can selectively issue a service notification in a single NW or a plurality of NWs.

According to an aspect of the disclosure, a communication apparatus includes a participation unit configured to join a network in which joining apparatuses perform communication using a predetermined signal therebetween, a first notification unit configured, in a case where there are a first network in which joining apparatuses perform communication using the predetermined signal therebetween and a second network in which joining apparatuses perform communication using the predetermined signal therebetween, to join either the first or second network via the participation unit based on a first predetermined value set for the first network and a second predetermined value set for the second network, and issue a notification in the joined network of a service that the communication apparatus provides, and not issue a notification of the service in the other network by not joining the other network, a second notification unit configured to, in a case where there are the first and second networks, join the first and second networks by using the participation unit, issue a notification in the first network of the service that the communication device provides, and issue a notification in the second network as well of the service that the communication device provides, and a selection unit configured to receive a selection to select whether to issue a notification of the service by the first notification unit or issue a notification of the service by the second notification unit.

Further features will become apparent from the following description of exemplary embodiments with reference to the attached drawings.

DESCRIPTION OF THE EMBODIMENTS

Exemplary embodiments will be described in detail below with reference to the accompanying drawings. Configurations described in the following exemplary embodiments are just examples, and the disclosure is not limited to the following configurations.

Figure 1:
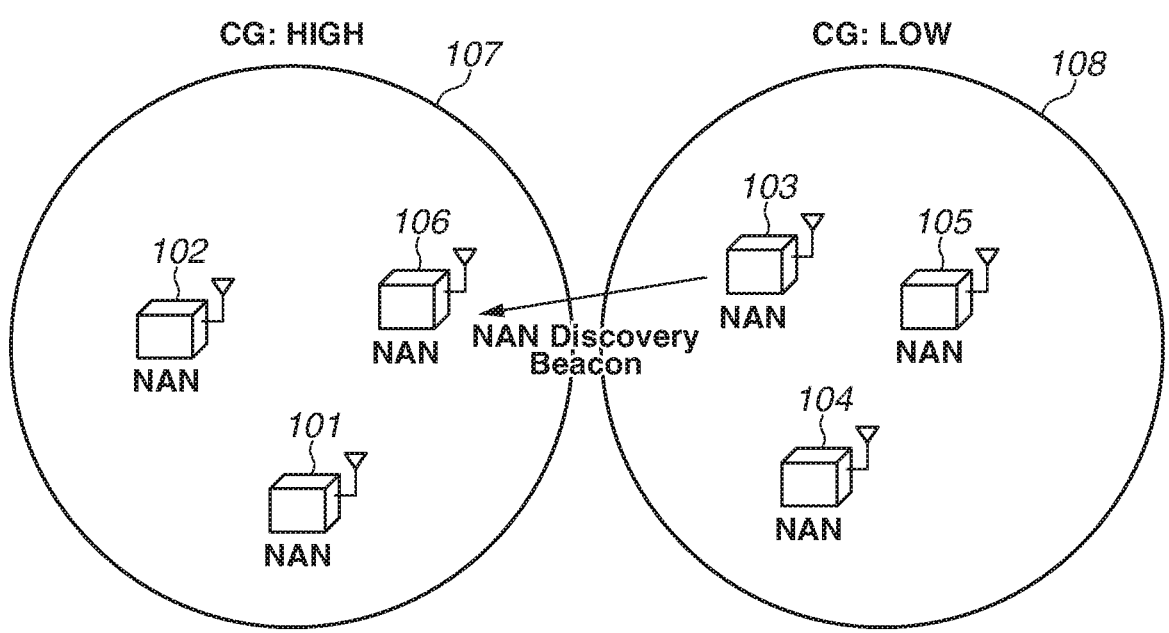
FIG. 1 is a diagram illustrating a configuration of networks which Neighbor Awareness Network (NAN) devices join.

FIG. 1 is a diagram illustrating a configuration of networks (NWs) which a Neighbor Awareness Network (NAN) device 106 according to the present exemplary embodiment joins.

In the present exemplary embodiment, NAN devices 101, 102, 103, 104, 105, and 106 perform wireless communication by a wireless communication method compliant with the Wi-Fi NAN standard. Aside from wireless communication compliant with the Wi-Fi NAN standard, the NAN devices 101 to 106 may each perform communication by wireless communication methods compliant with the Institute of Electrical and Electronics Engineers (IEEE) 802.11 series standards other than the Wi-Fi NAN standard. Communication methods compliant with other wireless communication methods, such as Bluetooth (registered trademark), ultra-wideband (UWB), and Zigbee (registered trademark), may be used. UWB techniques include Wireless Universal Serial Bus (USB), Wireless 1394, and WiNet. Communication methods compliant with wired communication methods such as the Ethernet may also be used.

The NAN device 106 is a printing apparatus which provides image and document print services. The NAN device 106 may be a printing apparatus such as a printer or a multifunction peripheral (MFP). The NAN device 106 may be a providing apparatus for providing other services, such as a screen share service, in addition to or instead of the print services. Other specific examples of the NAN device 106 may include, but not limited to, a tablet, a display, and a projector.

The NAN devices 101, 102, 103, 104, and 105 are communication apparatuses capable of searching for services provided by other apparatuses. Specific examples include, but not limited to, communication apparatuses such as a smartphone, a tablet, a personal computer (PC), and a head-mounted display.

In the present exemplary embodiment, the NAN devices 101, 102, and 106 join a NAN cluster 107. The NAN devices 103, 104, and 105 join a NAN cluster 108.

NAN devices joining the same NAN cluster share a period for transmitting and receiving a NAN Synchronization Beacon. The period in which the signal is transmitted and received (period in which communication using the signal is performed) is referred to as a Discovery Window (DW). The NAN Synchronization Beacon is a synchronization signal for enabling synchronization of the NAN devices joining the same NAN cluster. In the present exemplary embodiment, a DW has a length of 16 time units (TUs). The interval from the beginning of a DW to the beginning of the next DW is 512 TUs. One TU has a duration of 1024 µs. The length and interval of DWs are not limited thereto.

The role of a Master or a Non-Master is assigned to each of NAN devices joining a NAN cluster. A NAN device to which the role of a Non-Master is assigned enters a Sync state or a Non-Sync state. A NAN device that is a Master transmits a NAN Synchronization Beacon during a DW, and transmits a NAN Discovery Beacon outside the DW. A NAN device that is a Non-Master and is in a Sync state transmits a NAN Synchronization Beacon during a DW, but does not transmit a NAN Discovery Beacon. A NAN device that is a Non-Master and is in a Non-Sync state transmits neither a NAN Synchronization Beacon during a DW nor a NAN Discovery Beacon. NAN devices, even in a Non-Sync state, share a DW in the NAN cluster which the NAN devices join.

The NAN Discovery Beacon is a signal transmitted outside a DW. The NAN Discovery Beacon is an informing signal for a NAN device to inform NAN devices joining other NAN clusters and NAN devices not joining any NAN cluster, of the presence of the NAN cluster which the own device joins.

The roles of NAN devices are determined depending on Master Ranks of the respective NAN devices. The Master Rank is determined based on a Master Preference, a Random Factor, and a NAN Interface Address. The Master Preference is a value set for each NAN device. The higher the Master Preference is, the higher the Master Rank is and therefore the more likely the NAN device is to be a Master in a NAN cluster.

The Master Preference may be determined by any method. For example, a high Master Preference may be given to NAN devices powered by commercial power supply and NAN devices having high clock stability. A low Master Preference may be given to NAN devices expected to be used on the move, like a mobile terminal.

The Random Factor is a value set at random. Any one of integers 0 to 255 is randomly selected. The NAN Interface Address is a value based on the media access control (MAC) address of the NAN device.

The Master Rank is determined based on the following Eq. 1:

$$\text{Master Rank} = \text{Master Preference}*2^{56} + \text{Random Factor}*2^{48} + \text{MAC}[5]*2^{40} + \ldots + \text{MAC}[0] \quad (1)$$

MAC[0] to MAC[5] in Eq. 1 represent respective 8-bit segments from the top of the MAC address (48 bits) of the NAN device.

The higher the Master Rank determined based on the foregoing Eq. 1, the more likely the NAN device is to be a Master in a NAN cluster. An Anchor Master refers to a NAN device having the highest Master Rank in a NAN cluster.

In the present exemplary embodiment, the NAN devices 101, 102, and 106 join the NAN cluster 107. The NAN devices 103, 104, and 105 join the NAN cluster 108. A Cluster Grade (CG) is set for each NAN cluster. The CG is set by the following Eq. 2:

$$CG = 2^{64}*A1 + A2 \quad (2)$$

In Eq. 2, A1 is the Master Preference of the Anchor Master in the NAN cluster. A2 is a Time Synchronization Function (TSF) value. The TSF is a time stamp included in a NAN Synchronization Beacon, and is used for NAN devices in a NAN cluster to synchronize with an Anchor Master.

A NAN device joining a NAN cluster detects another NAN cluster by receiving a NAN Discovery Beacon transmitted from a NAN device joining the another NAN cluster. A NAN device may detect another NAN cluster by receiving a NAN Synchronization Beacon.

A NAN device joins a NAN cluster having a higher CG. Specifically, if a NAN device detects a NAN cluster and the CG of the detected NAN cluster is higher than that of the NAN cluster which the own device joins, the NAN device joins the detected NAN cluster and leaves the original NAN cluster. Such an operation of the NAN device is called merge. If the NAN device detecting another NAN cluster has the role of a Master, the NAN device may transmit a NAN Synchronization Beacon about the new detected NAN cluster during the DW of the NAN cluster which the NAN device has so far joined. The same applies when the NAN device detecting another NAN cluster has the role of a Non-Master and is in a Sync state. Other NAN devices joining the NAN cluster which the NAN device has joined then perform signal transmission and reception in the DW of the new detected NAN cluster. In the present exemplary embodiment, the NAN cluster 108 has a CG lower than that of the NAN cluster 107.

Even if a NAN device joining a NAN cluster detects another NAN cluster having a CG higher than that of the NAN cluster which the own device joins, the NAN device does not always need to merge with the detected NAN cluster. Specifically, when NAN devices in the NAN cluster which the own device joins are performing data transmission and reception with each other via wireless communication compliant with the Wi-Fi NAN standard, the NAN device does not need to merge with the NAN cluster of higher CG. Instead of the wireless communication compliant with the Wi-Fi NAN standard, the NAN devices may perform the data transmission and reception via wireless communication compliant with an IEEE 802.11 series standard other than the Wi-Fi NAN standard. Instead of the wireless communication compliant with the Wi-Fi NAN standard, the NAN devices may perform the data transmission and reception via wireless communication compliant with another wireless communication method such as Bluetooth, UWB, or Zigbee. In the present exemplary embodiment, the NAN device 103 in the NAN cluster 108 performs data transmission and reception with at least either one of the NAN devices 104 and 105. Although the NAN cluster 108 has a CG lower than that of the NAN cluster 107, the NAN devices 103, 104, and 105 joining the NAN cluster 108 therefore do not need to merge with the NAN cluster 107 when the NAN cluster 107 is detected.

A NAN device can notify other NAN devices in the NAN cluster which the NAN device joins of a service or services provided by the own device. Specifically, the NAN device transmits a Publish message during a DW. The Publish message is a notification signal for notifying the NAN devices joining the same NAN cluster what service(s) the own device can provide. Such a service notification will be referred to as an unsolicited service notification.

The NAN device may transmit a Publish message to another NAN device joining the same NAN cluster by receiving a Subscribe message from another NAN device joining the same NAN cluster. The Subscribe message is an inquiry signal for inquiring of a NAN device joining the same NAN cluster what services can be provided. Such a service notification will be referred to as a solicited service notification.

The NAN device may notify another NAN device of more detailed information about the service(s) that the own device provides, by transmitting a Follow-up message in addition to the Publish message. The NAN device may use a Generic Advertisement Service (GAS) message.

In an unsolicited service notification, the NAN device issues a notification of all services that the own device can provide, by using a Publish message. The NAN device may issue a notification of only a specific service or services, of a service corresponding to an application running on the own device, a service determined based on a user instruction, and/or the like.

In a solicited service notification, the NAN device transmitting a Subscribe message can search to find out whether another NAN device can provide a desired service, by specifying the desired service. A NAN device receiving the Subscribe message transmits a Publish message in a case where the own device can provide the specified service. The NAN device transmitting a Subscribe message may specify no desired service or a wildcard in transmitting the Subscribe message. In such cases, a NAN device receiving the Subscribe message issues a notification of all services that the own device can provide, by using a Publish message. The NAN device may issue a notification of only a specific service or services, of a service corresponding to an application running on the own device, a service determined based on a user instruction, and/or the like.

A NAN device forms a NAN cluster when starting wireless communication compliant with the Wi-Fi NAN standard. The NAN device forming a NAN cluster sets the Master Preference and Random Factor of the own device to 0 for a predetermined time. The CG of the NAN cluster formed by the NAN device is therefore extremely low during the predetermined time. After a lapse of the predetermined time or when merging with a NAN cluster in which the Anchor Master has a Master Preference higher than 0, the NAN device makes the Master Preference of the own device higher than 0.

A NAN device does not need to form a NAN cluster when starting wireless communication compliant with the Wi-Fi NAN standard. When starting wireless communication compliant with the Wi-Fi NAN standard, such a NAN device detects a NAN cluster and joins the detected NAN cluster. When a plurality of NAN clusters is detected, the NAN device joins a NAN cluster having the highest CG. The NAN device may join a NAN cluster first detected.

Figure 2:
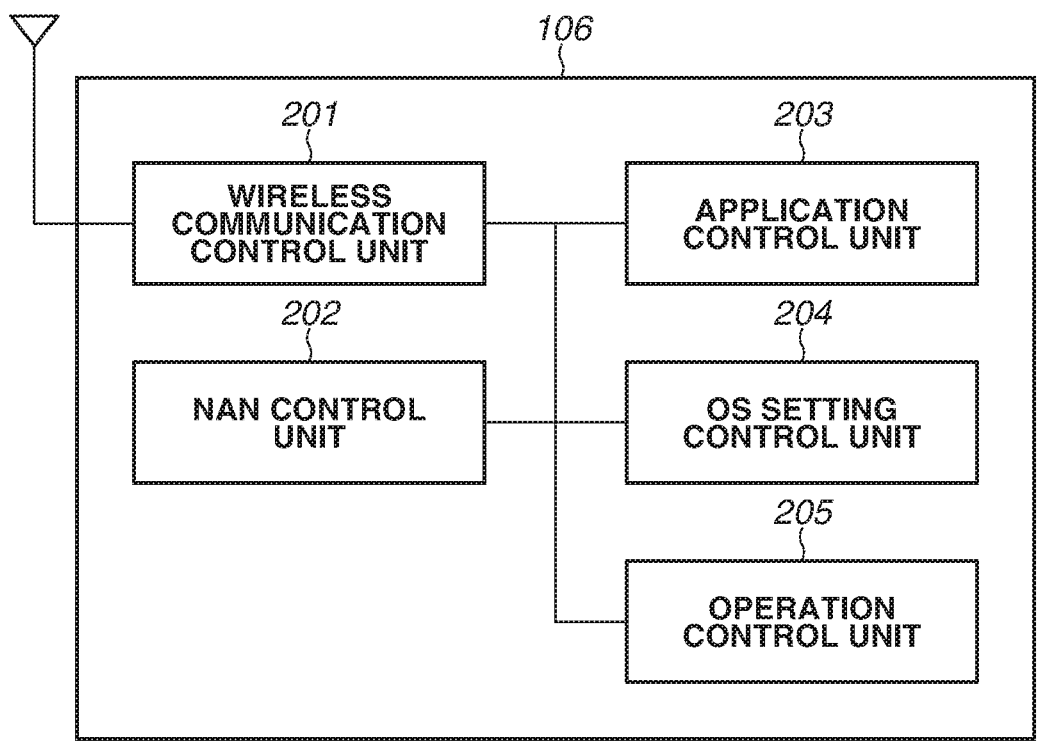
FIG. 2 is a diagram illustrating a functional configuration of a NAN device.

FIG. 2 is a diagram illustrating a functional configuration of the NAN device 106. The NAN devices 101, 102, 103, 104, and 105 each have a functional configuration similar to that of the NAN device 106.

A wireless communication control unit 201 controls transmission and reception of wireless signals with other NAN devices and communication apparatuses capable of wireless communication. The wireless communication control unit 201 controls wireless communication by a wireless communication method compliant with the IEEE 802.11 series standard including the Wi-Fi NAN standard.

A NAN control unit 202 performs control compliant with the Wi-Fi NAN standard on the NAN device 106, and controls a start and end of wireless communication compliant with the Wi-Fi NAN standard. The NAN control unit 202 also performs control on a service notification. The NAN control unit 202 controls the wireless communication control unit 201 based on an operation mode which is determined by selection processing of the operation mode to be described below. The selection processing of the operation mode of the NAN device 106 will be described in detail in FIG. 4. The NAN control unit 202 reduces the power consumption of a communication unit 306 to be described below to enhance power saving performance by disabling the wireless communication of the wireless communication control unit 201 for a predetermined period. The predetermined period refers to a period from the end of a DW to the start of the next DW. When a NAN Discovery Beacon is transmitted or data transmission and reception are performed outside the DW, the NAN control unit 202 may enable wireless communication during the transmission of the signal or during the transmission and reception of data.

An application control unit 203 instructs the NAN control unit 202 to control the start and end of wireless communication compliant with the Wi-Fi NAN standard, based on processing of an application. The application control unit 203 also controls formation of a NW with a NAN device or devices detected by wireless communication compliant with the Wi-Fi NAN standard, and transmission and reception of data. Suppose, for example, that the user of the NAN device 106 activates a print service application that can use wireless communication compliant with the Wi-Fi NAN standard. In such a case, the application control unit 203 instructs the NAN control unit 202 to start wireless communication compliant with the Wi-Fi NAN standard. When the NAN control unit 202 controls the wireless communication control unit 201 and receives a request to start a service from another NAN device searching for a print service, a NW compliant with the Wi-Fi NAN standard is formed with the NAN device. The NAN device 106 performs transmission and reception of print data via the formed NW. When the user ends the print service application, the application control unit 203 instructs the NAN control unit 202 to end the wireless communication compliant with the Wi-Fi NAN standard. The NW for performing data transmission and reception may be one using wireless communication compliant with an IEEE 802.11 series standard other than the Wi-Fi NAN standard or one using wireless communication compliant with another wireless communication method such as Bluetooth, UWB, or Zigbee.

An operating system (OS) setting control unit 204 controls settings related to OS functions common among applications running on the NAN device 106. For example, as a setting of the OS functions, the OS setting control unit 204 may set a start and end of wireless communication compliant with the IEEE 802.11 series standard including the Wi-Fi NAN standard.

An operation control unit 205 manages operations made by the user of the NAN device 106 on an input unit 304 to be described below, and transmits needed signals to the other control units 201 to 204 based on the operations.

Figure 3:
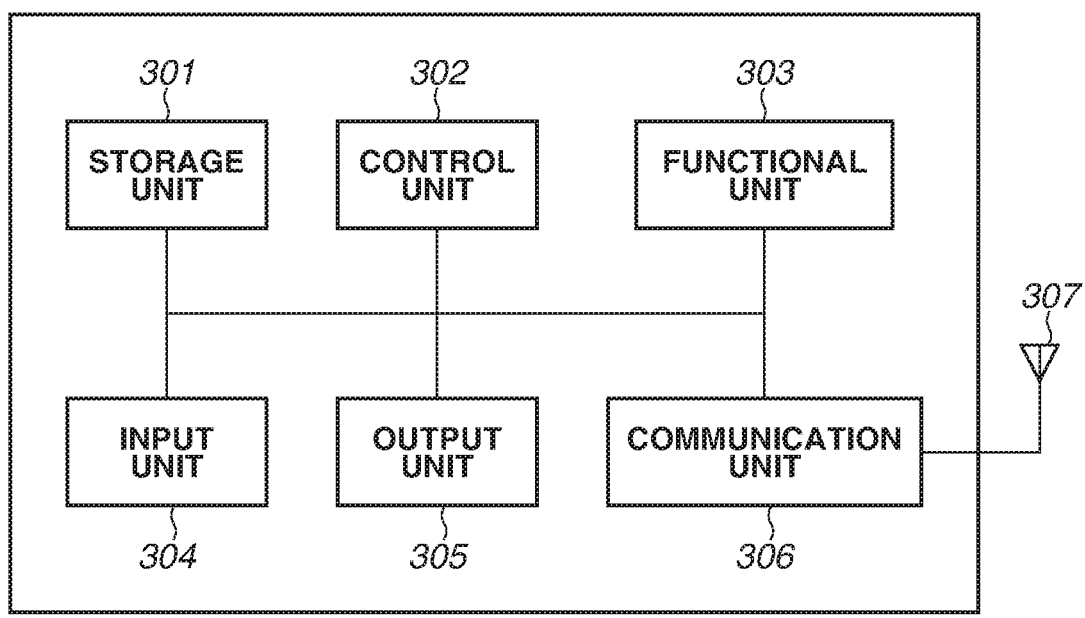
FIG. 3 is a diagram illustrating a hardware configuration of the NAN device.

FIG. 3 illustrates a hardware configuration of the NAN device 106. The NAN devices 101, 102, 103, 104, and 105 have a hardware configuration similar to that of the NAN device 106.

A storage unit 301 includes one or more memories of a read-only memory (ROM), a random access memory (RAM), and/or the like. The storage unit 301 stores computer programs for performing various operations to be described below, and various types of information such as communication parameters for wireless communication. Aside from memories such as a ROM and a RAM, the storage unit 301 may use storage media such as a flexible disk, a hard disk, an optical disk, a magneto-optical disk, a compact disc read-only memory (CD-ROM), a compact disc-recordable (CD-R), a magnetic tape, a nonvolatile memory card, and a digital versatile disc (DVD). The storage unit 301 may include a plurality of memories.

A control unit 302 includes one or more processors of a central processing unit (CPU), a micro processing unit (MPU), and/or the like which function(s) as a computer. The control unit 302 controls the entire NAN device 106 by executing the computer programs stored in the storage unit 301. The control unit 302 may control the entire NAN device 106 by cooperation of the programs and an OS stored in the storage unit 301. The control unit 302 may include a plurality of processors like a multicore processor, and control the entire NAN device 106 by using the plurality of processors.

The control unit 302 controls a functional unit 303 to perform predetermined processing such as imaging and browsing of contents. The functional unit 303 is hardware for the NAN device 106 to perform the predetermined processing. For example, in a case where the NAN device 106 is a printing apparatus, the functional unit 303 is a printing unit and performs print processing. For example, in a case where the NAN device 106 is a projector, the functional unit 303 is a projection unit and performs projection processing. Data to be processed by the functional unit 303 may be stored in the storage unit 301, or received from another NAN device via the communication unit 306 to be described below.

The input unit 304 accepts various operations from the user. An output unit 305 makes various outputs to the user via a monitor screen and a speaker. Possible outputs of the output unit 305 may include, aside from a display on a screen, a sound output by the speaker and a vibration output. The input unit 304 and the output destination of the output unit 305 may be implemented as a single module by using a touch panel. The input unit 304 and the output unit 305 may be integrated with or separate from the NAN device 106. The NAN device 106 does not need to include the input unit 304 or the output unit 305.

The communication unit 306 controls wireless communication compliant with the IEEE 802.11 series standard including the Wi-Fi NAN standard, and controls Internet Protocol (IP) communication. The communication unit 306 also controls an antenna 307 to transmit and receive wireless signals for wireless communication.

The NAN device 106 transmits and receives data, such as image data, document data, and video data, to/from other NAN devices via the communication unit 306. The communication unit 306 has a function of transmitting data and a function of receiving data, and can switch the functions between enabled and disabled according to instructions of the control unit 302. The transmission and reception functions each consume power when enabled. When disabled, the transmission and reception functions do not consume power or can operate with lower power consumption than when enabled.

Figure 4:
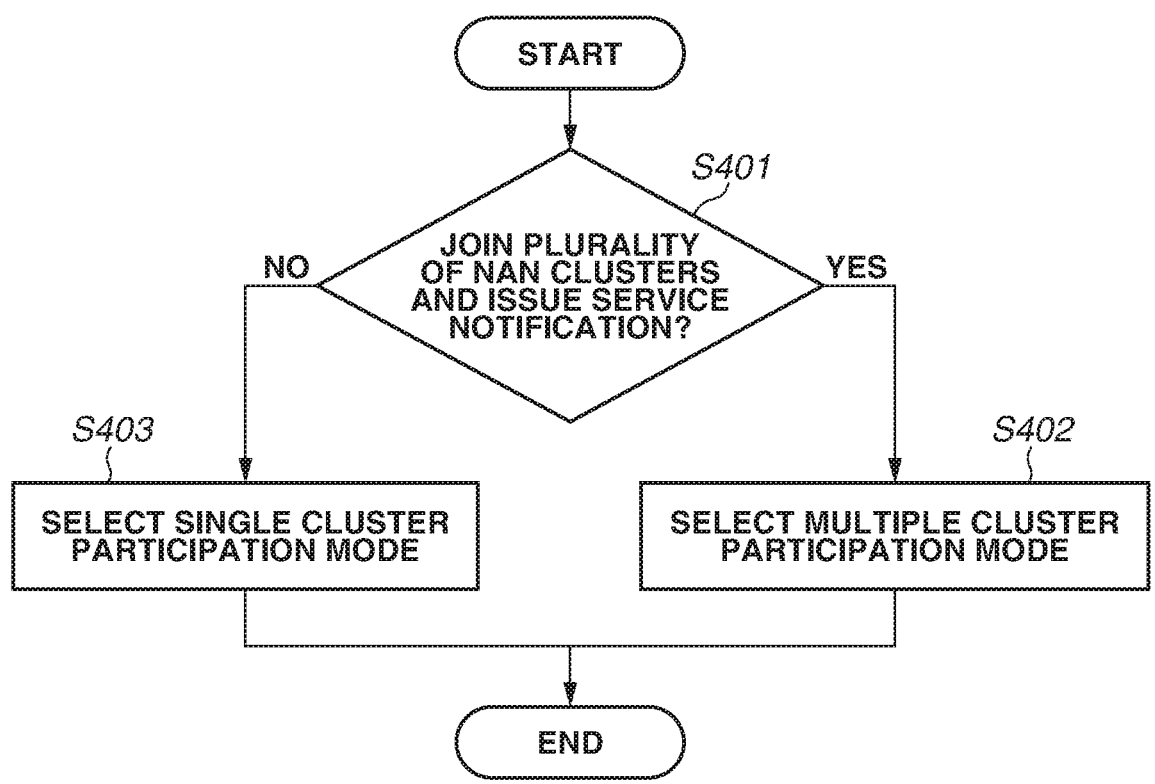
FIG. 4 is a flowchart illustrating processing performed when the NAN device selects an operation mode.

FIG. 4 is a flowchart illustrating processing that is implemented by the control unit 302 reading and executing a program stored in the storage unit 301 when the NAN device 106 selects an operation mode.

The flow of the present flowchart is started when the NAN device 106 starts wireless communication compliant with the Wi-Fi NAN standard. The wireless communication compliant with the Wi-Fi NAN standard is started, for example, based on activation of the print service application of the NAN device 106. Here, the wireless communication compliant with the Wi-Fi NAN standard may be started when the activation of the application is started, in process, or completed, or in response to an activation instruction for the application. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. The flow of the present flowchart may be started based on activation of a specific application on the NAN device 106 or a change in the OS settings. The flow of the present flowchart may be started based on participation of the NAN device 106 in a NAN cluster, or may be started based on a change in whether the NAN device 106 is battery powered.

In step S401, the control unit 302 of the NAN device 106 determines whether to join a plurality of NAN clusters and issue a service notification. The determination is made based on whether the NAN device 106 is battery powered. If the NAN device 106 is battery powered, the determination is no. If the NAN device 106 is non-battery powered, i.e., powered by commercial power supply, the determination is yes. If the control unit 302 of the NAN device 106 needs to actively issue a notification of a service that the own device provides, the determination is yes. If power saving has higher priority than service detection, the determination is no. For example, if an application using some service is running on the NAN device 106, the control unit 302 of the NAN device 106 may determine to join a plurality of NAN clusters and issue a notification of the service. The determination may be made based on the type of service used by the application. For example, when an advertisement application is running, the control unit 302 may determine to join a plurality of NAN clusters and issue a service notification to actively notify other NAN devices of an advertisement. The determination may be made based on user instructions. For example, if the NAN device 106 starting wireless communication compliant with the Wi-Fi NAN standard is battery powered, the user is likely to expect the NAN device 106 to issue a service notification with saved power. The determination of the control unit 302 of the NAN device 106 in step S401 is then no, and the control unit 302 selects a single cluster participation mode (power saving notification mode). On the other hand, if the NAN device 106 starting wireless communication compliant with the Wi-Fi NAN standard is not battery powered, the user is likely to expect the NAN device 106 to actively issue a service notification. The determination of the control unit 302 of the NAN device 106 in step S401 is then yes, and the control unit 302 selects a multiple cluster participation mode (active notification mode). Such selection examples are just examples. Which notification mode to select depending on how the wireless communication compliant with the Wi-Fi NAN standard is started is not limited thereto.

In step S401, if the control unit 302 of the NAN device 106 determines to join a plurality of NAN clusters and issue a service notification (YES in step S401), the processing proceeds to step S402. In step S402, the control unit 302 of the NAN device 106 selects the multiple cluster participation mode. The flow of the present flowchart ends. On the other hand, if the control unit 302 of the NAN device 106 determines not to join a plurality of NAN cluster and issue a service notification (NO in step S401), the processing proceeds to step S403. In step S403, the control unit 302 of the NAN device 106 selects the single cluster participation mode. The flow of the present flowchart ends.

If the single cluster participation mode is selected, the NAN device 106 detects and merges with a NAN cluster having a CG higher than that of the NAN cluster which the NAN device 106 joins. When the NAN device 106 informs the NAN cluster which the NAN device 106 has originally joined of information about the new NAN cluster to join, the NAN device 106 may temporarily enter a state of joining two NAN clusters. Such a case is also covered by the single cluster participation mode of joining a single NAN cluster and issuing a service notification.

Figure 5:
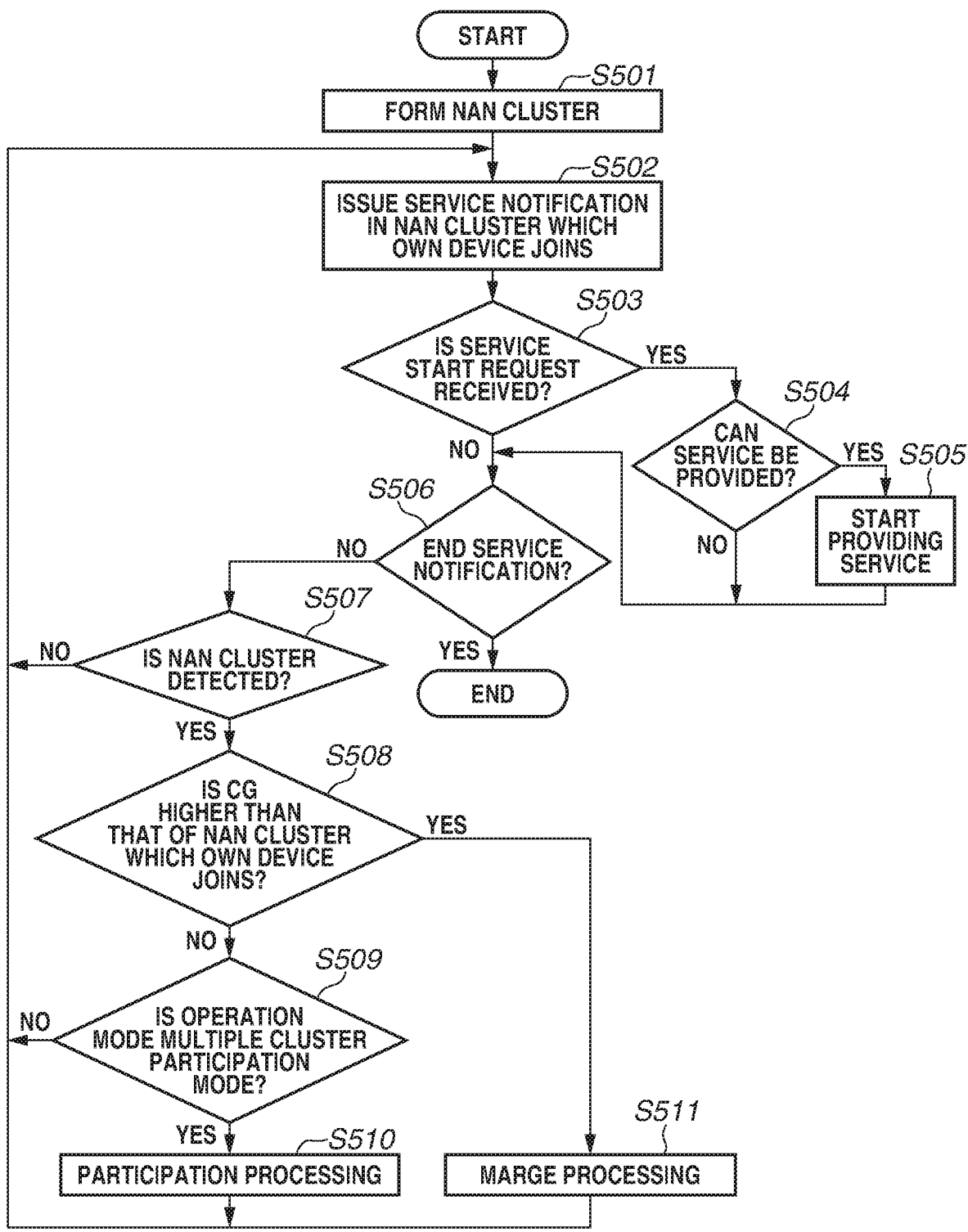
FIG. 5 is a flowchart illustrating processing performed when the NAN device forming a NAN cluster issues a service notification.

FIG. 5 is a flowchart illustrating processing that is implemented by the control unit 302 reading and executing a program stored in the storage unit 301 when the NAN device 106 forming a NAN cluster issues a service notification.

The flow of the present flowchart is started when the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flow of the flowchart in FIG. 4, the flow of the flowchart in FIG. 4 is started first. The flow of the present flowchart is started after that in FIG. 4 ends. Alternatively, the NAN device 106 may perform the processing of the flowcharts in FIGS. 4 and 5 in parallel.

If wireless communication compliant with the Wi-Fi NAN standard is started, then in step S501, the control unit 302 of the NAN device 106 initially forms a NAN cluster. In step S502, the control unit 302 of the NAN device 106 notifies NAN devices in the NAN cluster which the own device joins, of a service that the own device provides. Whether the NAN device 106 issues a solicited service notification or an unsolicited service notification is preset in the NAN device 106.

The control unit 302 of the NAN device 106 may make the determination based on which mode is selected in FIG. 4, the single cluster participation mode or the multiple cluster participation mode. For example, if the single cluster participation mode is selected in FIG. 4, the control unit 302 of the NAN device 106 may determine to issue a solicited service notification. If the multiple cluster participation mode is selected in FIG. 4, the control unit 302 of the NAN device 106 may determine to issue an unsolicited service notification. If the single cluster participation mode is selected as the operation mode of the NAN device 106, the NAN device 106 can thus issue a notification of the service with saved power by issuing a solicited service notification. On the other hand, if the multiple cluster participation mode is selected as the operation mode of the NAN device 106, higher priority can be given to the notification of the service by performing an unsolicited service notification.

Alternatively, whether to issue a solicited service notification or an unsolicited service notification may be determined by the user.

In the present flowchart, the control unit 302 of the NAN device 106 issues an unsolicited service notification in step S502. Specifically, the control unit 302 of the NAN device 106 notifies another NAN devices joining the NAN cluster which the own device joins, of the service that the own device provides, by transmitting a Publish message.

In step S503, the control unit 302 of the NAN device 106 determines whether a service start request for the service provided by the own device is received from another NAN device. Specifically, the control unit 302 of the NAN device 106 waits for a service start request transmitted from another NAN device for a predetermined time.

If a service start request is determined to be received from another NAN device (YES in step S503), the processing proceeds to step S504. In step S504, the control unit 302 of the NAN device 106 determines whether the service for which the start request is received can be provided. For example, if there is an upper limit to the number of NAN devices that the service for which the start request is received can be simultaneously provided for, the control unit 302 of the NAN device 106 determines whether the number of NAN devices already provided with the service reaches the upper limit.

If the service for which the start request is received from another NAN device is determined to be able to be provided (YES in step S504), the processing proceeds to step S505. In step S505, the control unit 302 of the NAN device 106 starts providing the service. Specifically, the NAN device 106 starts providing the service to the NAN device transmitting the start request, via the wireless communication compliant with the Wi-Fi NAN standard. The NAN device 106 may start providing the service via wireless communication compliant with an IEEE 802.11 series standard other than the Wi-Fi NAN standard, or wireless communication compliant with another wireless communication method such as Bluetooth, UWB, or Zigbee. After the start of provision of the service, the processing proceeds to step S506.

On the other hand, if the service for which the start request is received from another NAN device is determined to be unable to be provided (NO in step S504), the processing proceeds to step S506. In step S506, the control unit 302 of the NAN device 106 determines whether to end the service notification. The control unit 302 makes the determination based on a user instruction. The control unit 302 may make the determination based on whether the NAN device 106 joins a predetermined number of NAN clusters or more. For example, if the NAN device 106 joins a predetermined number of NAN clusters or more, the control unit 302 of the NAN device 106 may determine to end the service notification. If the NAN device 106 is battery powered, the control unit 302 may make the determination based on the remaining level of the battery. In such a case, the control unit 302 of the NAN device 106 determines to end the service notification if the remaining level of the battery is low. The control unit 302 may make the determination based on whether the NAN device 106 has ended the wireless communication compliant with the Wi-Fi NAN standard. In such a case, the control unit 302 of NAN device 106 determines to end the service notification if the wireless communication compliant with the Wi-Fi NAN standard is ended. The control unit 302 may determine to end the service notification based on that the NAN device 106 has issued the service notification for a predetermined time. The control unit 302 may make the determination based on whether the NAN device 106 is providing a service to a predetermined number of NAN devices or more. If the NAN device 106 is providing a service to a predetermined number of NAN devices or more, the control unit 302 determines to end the service notification. In such a case, the NAN device 106 may make the determination based on one service or a plurality of services. If there is an upper limit to the number of NAN devices that the NAN device 106 can simultaneously provide a service for, the predetermined number is the upper limit number. The predetermined number may be a number set by the user, or a number determined based on the remaining battery level of the NAN device 106.

In step S503, if no service start request is determined to be received from another NAN device (NO in step S503), the processing also proceeds to step S506.

In step S506, if the service notification is determined to be ended (YES in step S506), the flow of the present flowchart ends. On the other hand, if the service notification is determined not to be ended (NO in step S506), the processing proceeds to step S507.

In step S507, the control unit 302 of the NAN device 106 determines whether a NAN cluster different from the NAN cluster which the own device joins is detected. Specifically, the NAN device 106 determines whether a NAN Discovery Beacon transmitted from a NAN device joining a NAN cluster different from that which the own device joins is received. The NAN device 106 may determine whether a NAN Synchronization Beacon is received, in addition to or instead of a NAN Discovery Beacon. In step S507, the NAN device 106 receives the signal during a DW. However, this is not restrictive, and the signal may be received outside the DW. The signal may be received in a step prior to the present step. If no other NAN cluster is determined to be detected (NO in step S507), the processing returns to step S502. If another NAN cluster is determined to be detected (YES in step S507), the processing proceeds to step S508. In step S508, the control unit 302 of the NAN device 106 obtains the CG of the detected NAN cluster, and determines whether the CG is higher than that of the NAN cluster which the own device joins.

If the CG of the detected NAN cluster is higher than that of the NAN cluster which the own device joins (YES in step S508), the processing proceeds to step S511. In step S511, the control unit 302 of the NAN device 106 merges with the detected NAN cluster. Specifically, the NAN device 106 joins the detected NAN cluster having the high CG, and leaves the NAN cluster which the NAN device 106 has so far joined.

On the other hand, if the CG of the detected NAN cluster is lower than or equal to that of the NAN cluster which the own device joins (NO in step S508), the processing proceeds to step S509. In step S509, the control unit 302 of the NAN device 106 determines whether the operation mode is the multiple cluster participation mode. If the operation mode of the NAN device 106 is not the multiple cluster participation mode, i.e., is the single cluster participation mode (NO in step S509), the processing returns to step S502.

On the other hand, if the operation mode of the NAN device 106 is the multiple cluster participation mode (YES instep S509), the processing proceeds to step S510. In step S510, the control unit 302 of the NAN device 106 performs processing for joining the detected NAN cluster. In such a case, the NAN device 106 does not leave the NAN cluster which the NAN device 106 has originally joined. After the end of the participation processing for joining the detected NAN cluster (step S510) or the merge processing (step S511), the processing returns to step S502. In step S502, the control unit 302 of the NAN device 106 issues a service notification in the newly joined NAN cluster. If the NAN device 106 joins a plurality of NAN clusters, the control unit 302 may issue a service notification in the NAN cluster(s) which the NAN device 106 already joins in addition to the newly joined NAN cluster.

If the control unit 302 of the NAN device 106 joins the new NAN cluster in step S510 and the number of NAN clusters which the NAN device 106 joins exceeds a predetermined number, the control unit 302 may leave one of the NAN clusters which the NAN device 106 has originally joined.

If the control unit 302 issues a notification of the service that the own device provides in the new NAN cluster joined in step S510 and no other NAN device uses the service, the NAN device 106 may leave the NAN cluster.

In the present flowchart, the control unit 302 of the NAN device 106 determines whether the CG of the detected NAN cluster is higher than that of the NAN cluster which the own device joins, and then determines whether the operation mode of the own device is the multiple cluster participation mode. However, this is not restrictive. The control unit 302 may determine the operation mode of the own device first, and then determine whether the CG of the detected NAN cluster is higher than that of the NAN cluster which the own device joins. Specifically, if the determination of step S507 is yes (YES in step S507), the processing proceeds to step S509. In step S509, if the operation mode of the NAN device 106 is determined to be the multiple cluster participation mode (YES in step S509), the control unit 302 of the NAN device 106 performs the processing of step S508. If the CG of the detected NAN cluster is determined to be higher than that of the NAN cluster which the own device joins (YES in step S508), the processing proceeds to step S511. On the other hand, if the CG of the detected NAN cluster is determined not to be higher than that of the NAN cluster which the own device joins (NO in step S508), the processing proceeds to step S510. In step S509, if the operation mode of the NAN device 106 is determined not to be the multiple cluster participation mode (NO in step S509), the control unit 302 of the NAN device 106 performs the processing of step S508. If the CG of the detected NAN cluster is determined to be higher than that of the NAN cluster which the own device joins (YES in step S508), the processing proceeds to step S511. On the other hand, if the CG of the detected NAN cluster is determined not to be higher than that of the NAN cluster which the own device joins (NO in step S508), the processing returns to step S502.

In the present flowchart, after step S501, the processing may skip steps S502 to S506 and proceed to step S507.

The control unit 302 of the NAN device 106 may end the flow of the present flowchart based on a user instruction while the flow of the present flowchart is in process.

If the NAN device 106 joins a plurality of NAN clusters, the communication unit 306 needs to be activated in the DWs of the respective NAN clusters, and the power consumption increases accordingly. In the case of the single cluster participation mode, the processing returns from step S509 to step S502, whereby higher priority can be given to power saving performance with the NAN device 106 joining only one NAN cluster.

In the case of the multiple cluster participation mode, the NAN device 106 also joins a NAN cluster having a CG lower than that of the NAN cluster which the own device joins, and issues a service notification. The NAN device 106 can thereby notify a greater number of NAN devices of the service that the own device provides. A NAN device joining a low-CG NAN cluster does not need to merge with a detected high-CG NAN cluster if NAN devices joining the low-CG NAN cluster are performing data transmission and reception with each other. NAN devices joining a NAN cluster having a CG lower than that of the NAN cluster which the own device joins therefore do not always merge with the NAN cluster which the own device joins. In the case of the multiple cluster participation mode, the NAN device 106 can notify a greater number of NAN devices of the service that the own device provides, by joining even a NAN cluster having a CG lower than that of the NAN cluster which the own device joins, and issuing a service notification.

Figure 6:
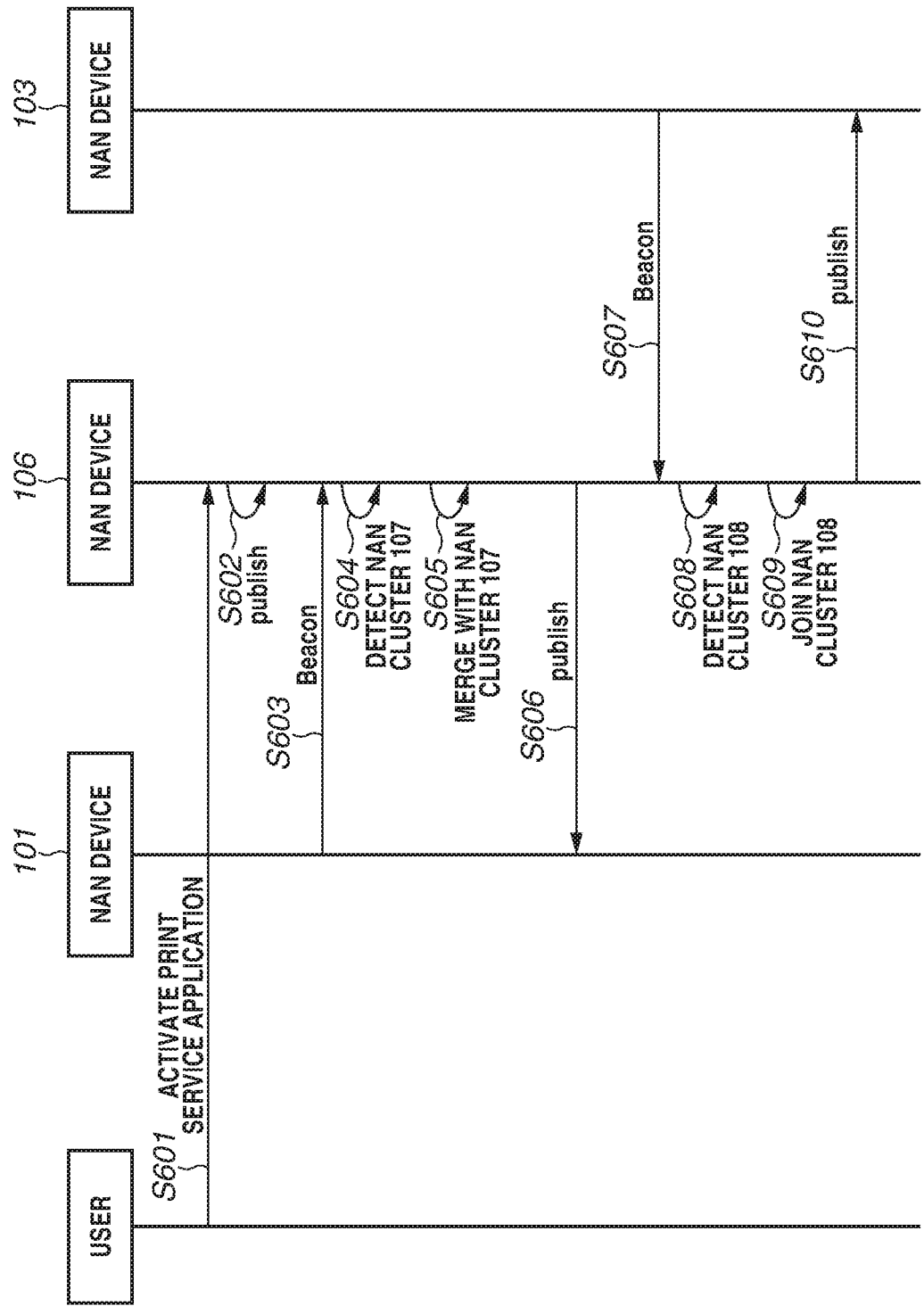
FIG. 6 is a sequence diagram illustrating processing performed when the NAN device issues a service notification in a multiple cluster participation mode.

FIG. 6 is a sequence diagram illustrating processing performed by the NAN device 106 when the NAN device 106 issues a service notification in the multiple cluster participation mode.

In step S601, the user initially activates the print service application of the NAN device 106. An applications related to a service other than a print service may be activated. The NAN device 106 starts wireless communication compliant with the Wi-Fi NAN standard based on the activation of the print service application. Since an application using a print service is activated, the NAN device 106 starts the flow of the flowchart in FIG. 4. In the present sequence, the NAN device 106 is assumed to be a non-battery powered printing apparatus. The NAN device 106 then selects the multiple cluster participation mode as its operation mode.

Starting wireless communication compliant with the Wi-Fi NAN standard, the NAN device 106 forms a NAN cluster. The NAN device 106 issues a service notification in the NAN cluster formed by the own device. Specifically, the NAN device 106 issues an unsolicited service notification to NAN devices joining the NAN cluster formed by the NAN device 106. In step S602, the NAN device 106 notifies NAN devices joining the NAN cluster that the NAN device 106 provides a print service, by using a Publish message. At this point in time, however, there is no other NAN device joining the NAN cluster, or no other NAN device joining the NAN cluster uses a print service. The NAN device 106 therefore does not receive a service start request.

In step S603, the NAN device 106 receives a NAN Discovery Beacon from the NAN device 101 joining the NAN cluster 107. In step S604, the NAN device 106 detects the NAN cluster 107 by receiving the NAN Discovery Beacon. The NAN device 106 may detect the NAN cluster 107 by reception of a NAN Synchronization Beacon. Since the Master Preference and Random Factor in the NAN cluster formed by the NAN device 106 are set to 0 for a predetermined time, the CG of the NAN cluster is lower than that of the NAN cluster 107. In step S605, the NAN device 106 therefore merges with the NAN cluster 107.

Alternatively, the NAN device 106 does not need to form a NAN cluster when starting wireless communication compliant with the Wi-Fi NAN standard. In such a case, when the NAN device 106 receives a NAN Discovery Beacon, the NAN device 106 joins the NAN cluster which the NAN device transmitting the signal joins. A NAN Synchronization Beacon may be received instead of a NAN Discovery Beacon. If a plurality of NAN clusters is detected, the NAN device 106 joins a NAN cluster having the highest CG. The NAN device 106 may join a NAN cluster first detected or a NAN cluster that is at a distance closest to the NAN device 106. The NAN cluster to be joined may be determined based on a user instruction.

In step S606, the NAN device 106 joins the NAN cluster 107 and issues a service notification in the NAN cluster 107. Specifically, the NAN device 106 issues an unsolicited service notification to the NAN devices 101 and 102 joining the NAN cluster 107. The NAN device 106 notifies, by a Publish message, the NAN devices 101 and 102 joining the NAN cluster 107 that the NAN device 106 provides a print service. Since neither of the other NAN devices 101 and 102 joining the NAN cluster 107 uses a print service, the NAN devices 106 does not receive a service start request.

The NAN device 106 receiving no service start request waits for a NAN Discovery Beacon from another NAN cluster. In step S607, the NAN device 106 receives a NAN Discovery Beacon from the NAN device 103 joining the NAN cluster 108. A NAN Synchronization Beacon may be received instead of a NAN Discovery Beacon.

In step S608, the NAN device 106 detects the NAN cluster 108 by the reception of the NAN Discovery Beacon from the NAN device 103. Since the NAN cluster 108 has a CG lower than that of the NAN cluster 107, the NAN device 106 does not merge with the NAN cluster 108. In step S609, the NAN device 106 joins the NAN cluster 108 since the operation mode of the NAN device 106 is the multiple cluster participation mode.

In step S610, the NAN device 106 joining the NAN cluster 108 issues a service notification in the NAN cluster 108. Specifically, the NAN device 106 issues an unsolicited service notification to the NAN devices 103, 104, and 105 joining the NAN cluster 108. The NAN device 106 notifies, by using a Publish message, the other NAN devices 103, 104, and 105 joining the NAN cluster 108 that the NAN device 106 provides a print service. The NAN device 106 may issue a service notification to the NAN devices joining the NAN cluster 107 again because a new NAN device may have joined the NAN cluster 107.

The service notifications issued in steps S602, S606, and S610 may be solicited service notifications instead of unsolicited ones. In such a case, the NAN device 106 waits for a Subscribe message transmitted from the NAN device joining the NAN cluster to issue a service notification, for a predetermined time. Receiving a Subscribe message, the NAN device 106 transmits a Publish message.

When issuing a service notification in steps S602, S606, and S610, the NAN device 106 may issue a notification of a plurality of services.

In the present sequence, if the operation mode is set to the multiple cluster participation mode and a NAN cluster having a CG lower than that of the NAN cluster which the own device joins is detected, the NAN device 106 joins the detected NAN cluster as well. This enables the NAN device 106 to also issue a service notification in the detected NAN cluster, so that a greater number of NAN devices can be notified of the service.

Figure 7:
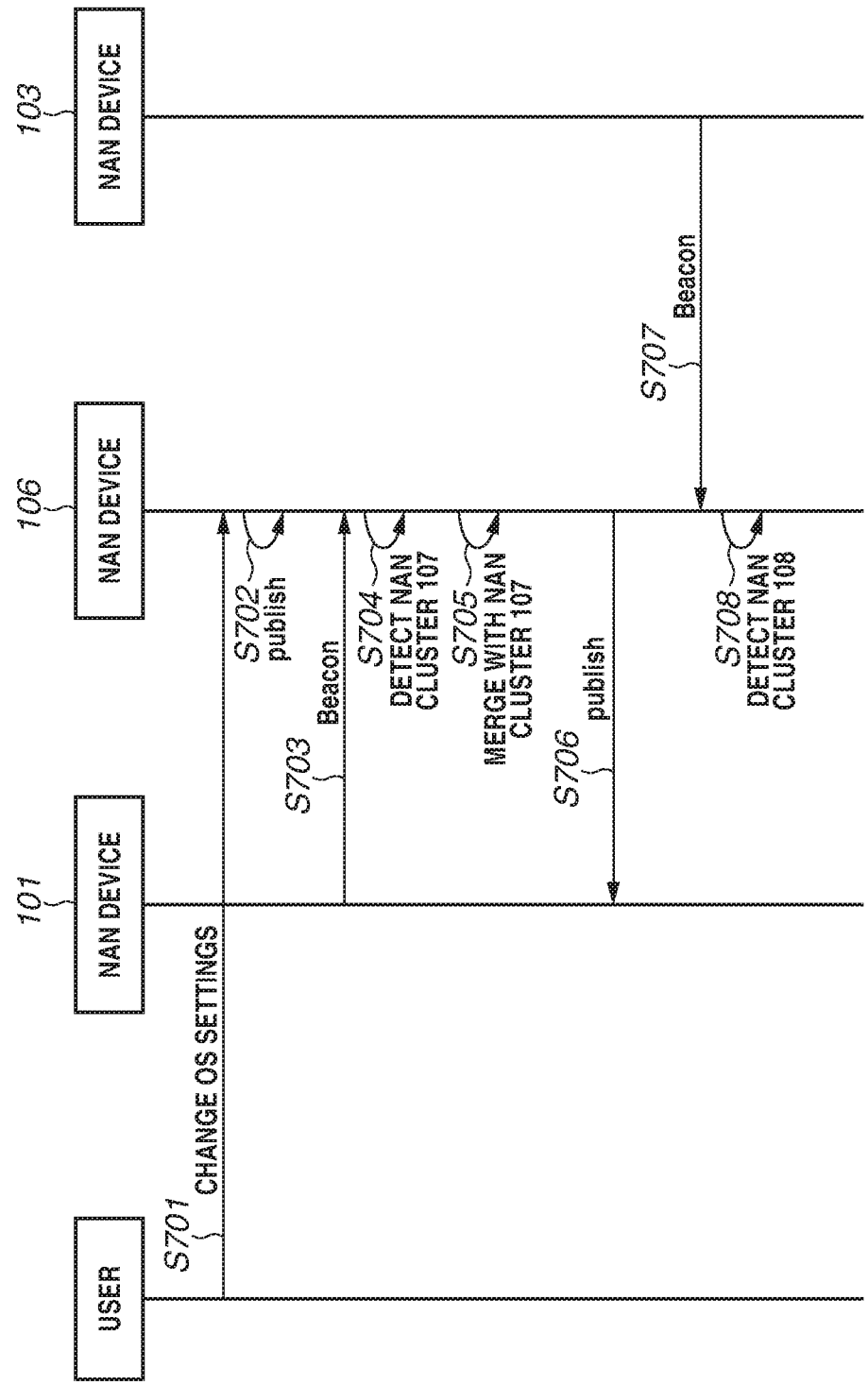
FIG. 7 is a sequence diagram illustrating processing performed when the NAN device issues a service notification in a single cluster participation mode.

FIG. 7 is a sequence diagram illustrating processing performed by the NAN device 106 when the NAN device 106 issues a service notification in the single cluster participation mode.

In step S701, the user changes the OS settings of the NAN device 106 and starts wireless communication compliant with the Wi-Fi NAN standard. Since wireless communication compliant with the Wi-Fi NAN standard is started, the NAN device 106 starts the flow of the flowchart in FIG. 4. In the present sequence, the NAN device 106 is assumed to be a battery powered printing apparatus. The NAN device 106 then selects the single cluster participation mode as its operation mode.

Starting wireless communication compliant with the Wi-Fi NAN standard, the NAN device 106 forms a NAN cluster. The NAN device 106 issues a service notification in the NAN cluster formed by the own device. Specifically, the NAN device 106 issues an unsolicited service notification to NAN devices joining the NAN cluster formed by the NAN device 106. In step S702, the NAN device 106 notifies NAN devices joining the NAN cluster that the NAN device 106 provides a print service, by using a Publish message. Since there is no other NAN device joining the NAN cluster, or no other NAN device joining the NAN cluster uses a print service, the NAN device 106 does not receive a service start request.

In step S703, the NAN device 106 receives a NAN Discovery Beacon from the NAN device 101 joining the NAN cluster 107. In step S704, the NAN device 106 detects the NAN cluster 107 by receiving the NAN Discovery Beacon. The NAN device 106 may detect the NAN cluster 107 by reception of a NAN Synchronization Beacon. Since the Master Preference and Random Factor in the NAN cluster formed by the NAN device 106 are set to 0 for a predetermined time, the CG of the NAN cluster is lower than that of the NAN cluster 107. In step S705, the NAN device 106 therefore merges with the NAN cluster 107.

Alternatively, the NAN device 106 does not need to form a NAN cluster when starting wireless communication compliant with the Wi-Fi NAN standard. In such a case, when the NAN device 106 receives a NAN Discovery Beacon, the NAN device 106 joins the NAN cluster which the NAN device transmitting the signal joins. A NAN Synchronization Beacon may be received instead of a NAN Discovery Beacon. If a plurality of NAN clusters is detected, the NAN device 106 joins a NAN cluster having the highest CG. The NAN device 106 may join a NAN cluster first detected or a NAN cluster that is at a distance closest to the NAN device 106. The NAN cluster to be joined may be determined based on a user instruction.

In step S706, the NAN device 106 joining the NAN cluster 107 issues a service notification in the NAN cluster 107. Specifically, the NAN device 106 issues an unsolicited service notification to the NAN devices 101 and 102 joining the NAN cluster 107. The NAN device 106 notifies, by a Publish message, the NAN devices 101 and 102 joining the NAN cluster 107 that the NAN device 106 provides a print service. Since neither of the other NAN devices 101 and 102 joining the NAN cluster 107 uses a print service, the NAN device 106 does not receive a service start request.

Receiving no service start request, the NAN device 106 waits for a NAN Discovery Beacon from another NAN cluster. In step S707, the NAN device 106 receives a NAN Discovery Beacon from the NAN device 103 joining the NAN cluster 108. A NAN Synchronization Beacon may be received instead of a NAN Discovery Beacon.

In step S708, the NAN device 106 detects the NAN cluster 108 by the reception of the NAN Discovery Beacon from the NAN device 103. Since the NAN cluster 108 has a CG lower than that of the NAN cluster 107, the NAN device 106 does not merge with the NAN cluster 108. Since the operation mode of the NAN device 106 is the single cluster participation mode, the NAN device 106 does not join the NAN cluster 108.

If the single cluster participation mode is selected and a NAN cluster having a CG lower than that of the NAN cluster which the own device joins is detected, the NAN device 106 does not join the detected NAN cluster. If the NAN device 106 joins a plurality of NAN clusters, the communication unit 306 of the NAN device 106 needs to be activated during the DWs of the respective joined NAN clusters, and the power consumption increases accordingly. In the case of the single cluster participation mode, higher priority can thus be given to power saving performance by joining only one NAN cluster.

Figure 8:
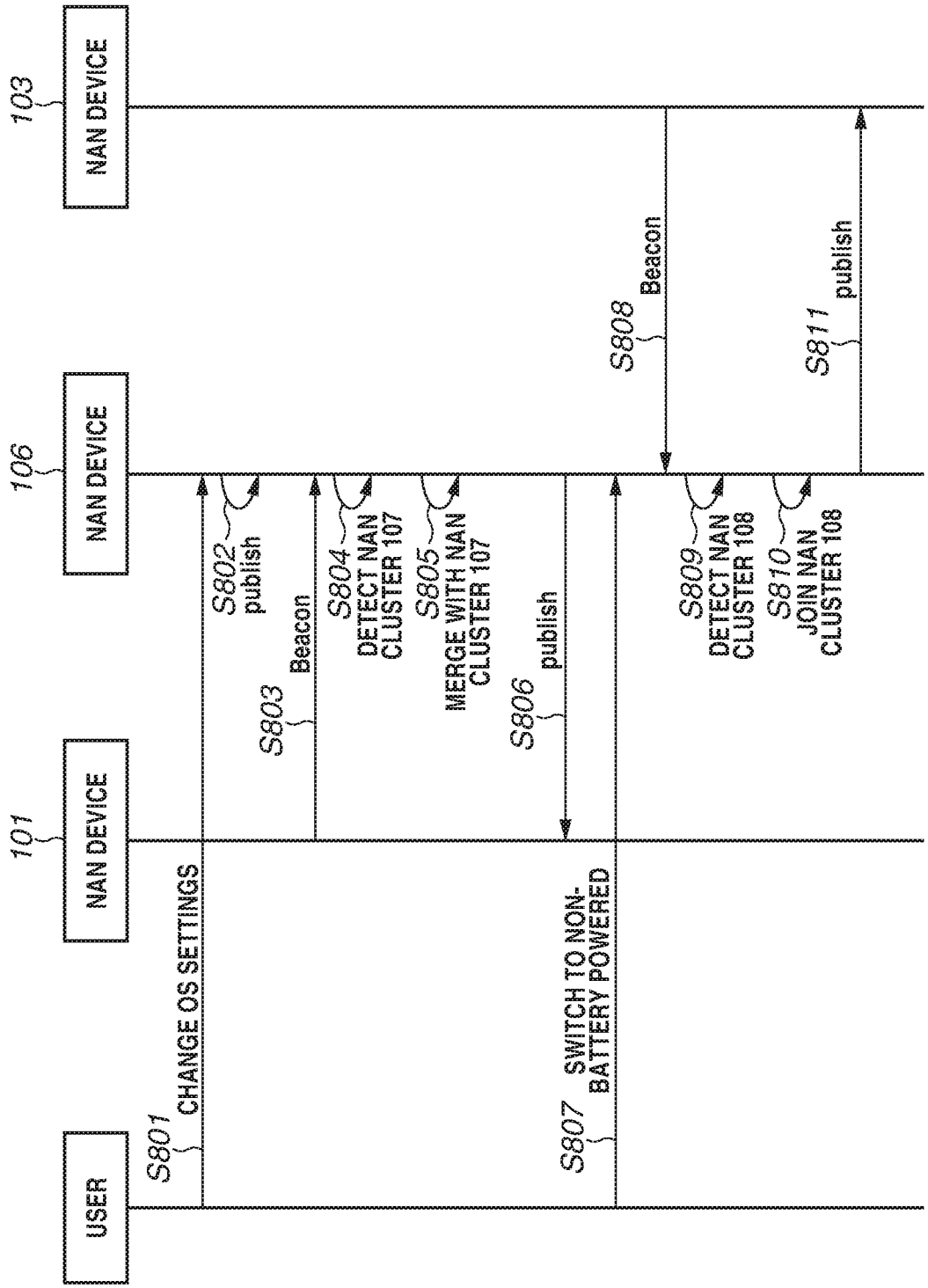
FIG. 8 is a sequence diagram illustrating processing performed when the NAN device starts wireless communication compliant with a Wi-Fi NAN standard, switches an operation mode, and issues a service notification.

FIG. 8 is a sequence diagram illustrating processing performed by the NAN device 106 when the NAN device 106 starts wireless communication compliant with the Wi-Fi NAN standard, switches the operation mode, and issues a service notification.

In step S801, the user changes the OS settings of the NAN device 106 and starts wireless communication compliant with the Wi-Fi NAN standard. Since wireless communication compliant with the Wi-Fi NAN standard is started, the NAN device 106 starts the flow of the flowchart in FIG. 4. In the present sequence, the NAN device 106 initially is battery powered. The NAN device 106 thus selects the single cluster participation mode as its operation mode.

Steps S802 to S806 are similar to steps S702 to S706 in FIG. 7, respectively.

In step S807, the NAN device 106 is switched from battery powered to non-battery powered, i.e., powered by commercial power supply. The flow of the flowchart in FIG. 4 is started by the switching of the NAN device 106 from battery powered to non-battery powered, and the operation mode of the NAN device 106 is switched to the multiple cluster participation mode.

Steps S808 to S811 are similar to steps S607 to S610 in FIG. 6.

In such a manner, even after the operation mode of the NAN device 106 is once selected, the operation mode may be selected again, for example, based on the switching of the NAN device 106 from battery powered to non-battery powered. If the NAN device 106 is joining a plurality of NAN clusters, the NAN device 106 may switch the operation mode to the single cluster participation mode. When the operation mode of the NAN device 106 is switched from the multiple cluster participation mode to the single cluster participation mode, the NAN device 106 may leave or not leave a NAN cluster or clusters having a CG lower than that of the NAN cluster which the own device joins.

The NAN device 106 can issue a service notification in an optimum operation mode by switching the operation mode of the NAN device 106 according to need.

Figure 9:
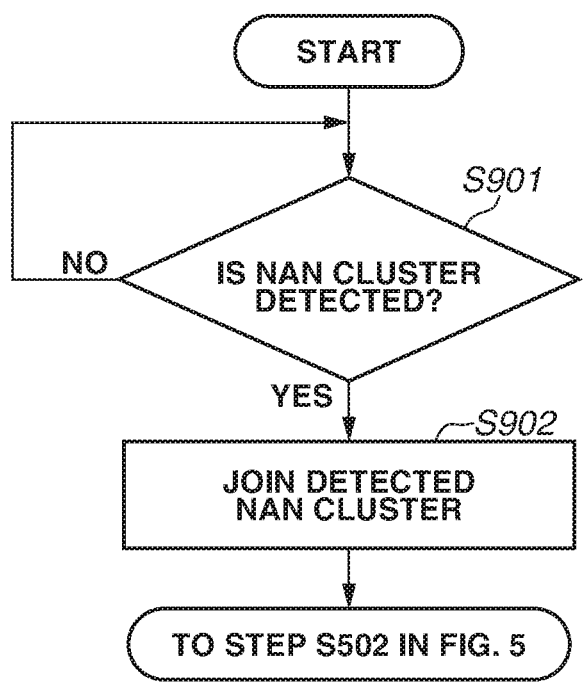
FIG. 9 is a flowchart illustrating processing performed when the NAN device issues a service notification.

FIG. 9 is a flowchart illustrating processing implemented by the control 302 reading and executing a program stored in the storage unit 301 when the NAN device 106 issues a service notification.

The flow of the present flowchart is started when the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flow of the flowchart in FIG. 4, the flow of the flowchart in FIG. 4 is started first. The flow of the present flowchart is started after that in FIG. 4 ends. Alternatively, the NAN device 106 may perform the processing of the flowcharts in FIGS. 4 and 9 in parallel.

In step S901, the control unit 302 of the NAN device 106 starts wireless communication compliant with the Wi-Fi NAN standard, and determines whether a NAN cluster is detected. The processing of this step is similar to that of step S507. The NAN device 106 in the present flowchart does not form a NAN cluster when starting wireless communication compliant with the Wi-Fi NAN standard. The NAN device 106 in the present flowchart waits for a NAN Discovery Beacon transmitted from another NAN device joining a NAN cluster. The NAN device 106 may wait for a NAN Synchronization Beacon.

If no NAN cluster is determined to be detected (NO in step S901), the processing returns to step S901. On the other hand, if a NAN cluster is determined to be detected (YES in step S901), the processing proceeds to step S902. In step S902, the control unit 302 of the NAN device 106 joins the NAN cluster detected in step S901. If a plurality of NAN clusters is detected in step S901, the NAN device 106 joins a NAN cluster having the highest CG. The NAN device 106 may join a NAN cluster first detected or a NAN cluster that is at a distance closest to the NAN device 106. The NAN cluster to be joined may be determined based on a user instruction. After the processing of step S902, the control unit 302 of the NAN device 106 performs the processing of step S502 and the subsequent steps in FIG. 5.

A second exemplary embodiment deals with processing in a case where a NAN device 106 selects its operation mode based on whether a service that the own device provides can be provided for another NAN device.

A configuration of NWs which NAN devices according to the present exemplary embodiment join is similar to that in FIG. 1. A functional configuration of the NAN devices according to the present exemplary embodiment is similar to that in FIG. 2. A hardware configuration of the NAN devices according to the present exemplary embodiment is similar to that in FIG. 3.

Figure 10:
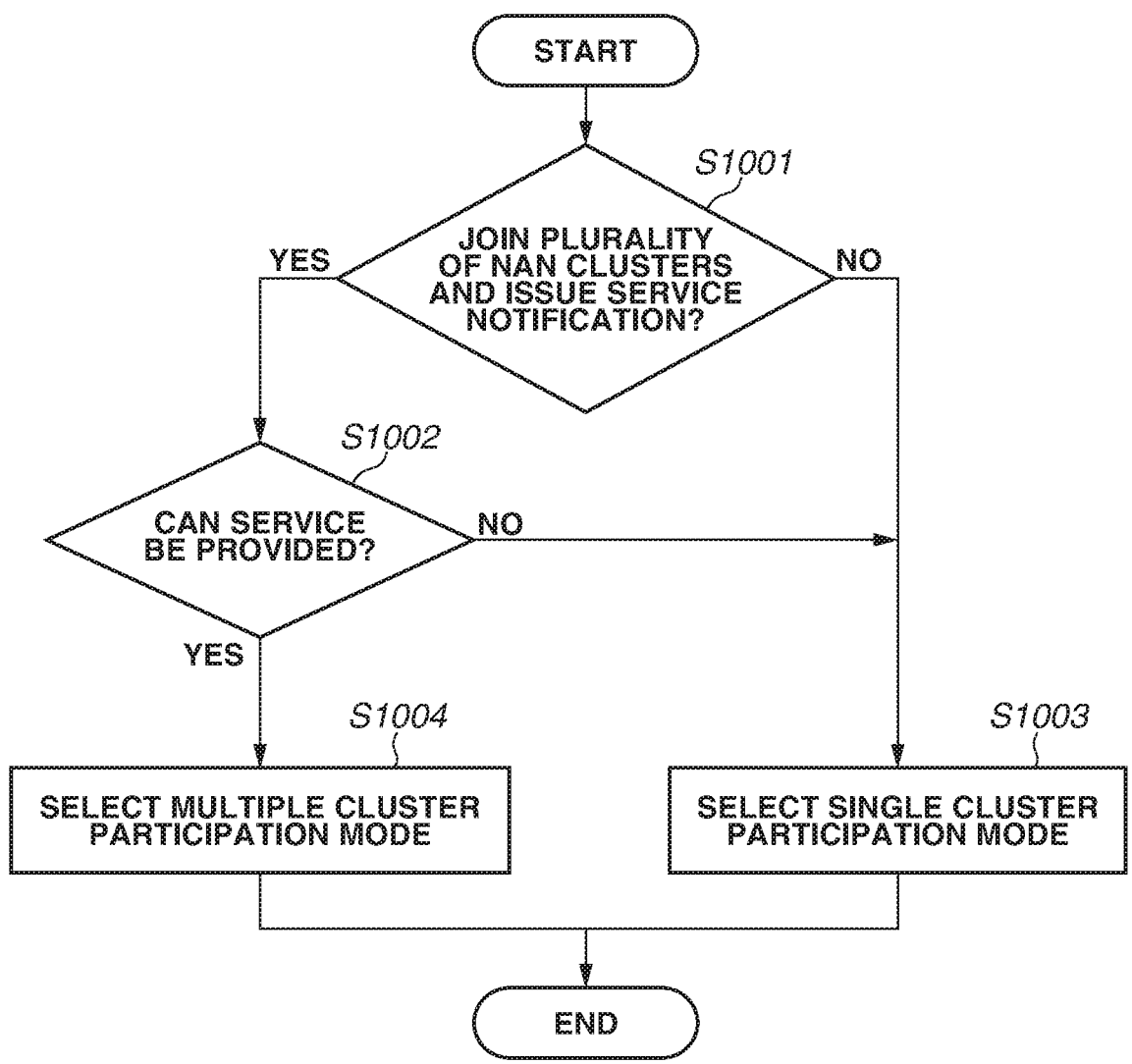
FIG. 10 is a flowchart illustrating processing performed when a NAN device selects an operation mode based on whether a service can be provided.

FIG. 10 is a flowchart illustrating processing implemented by the control unit 302 reading and executing a program stored in the storage unit 301 when the NAN device 106 selects the operation mode based on whether a service can be provided.

The flow of the present flowchart is started when the NAN device 106 starts wireless communication compliant with the Wi-Fi NAN standard. The wireless communication compliant with the Wi-Fi NAN standard is started, for example, based on activation of the print service application of the NAN device 106. Here, the wireless communication compliant with the Wi-Fi NAN standard may be started when the activation of the application is started, in process, or completed, or in response to an activation instruction for the application. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. The flow of the present flowchart may be started based on activation of a specific application on the NAN device 106 or a change in the OS settings. The flow of the present flowchart may be started based on participation of the NAN device 106 in a NAN cluster. The flow of the present flowchart may be started based on a change in whether the NAN device 106 is battery powered.

In step S1001, the control unit 302 of the NAN device 106 determines whether to join a plurality of NAN clusters and issue a service notification. The determination is made based on whether the NAN device 106 is battery powered. If the NAN device 106 is battery powered, the determination is no. If the NAN device 106 is non-battery powered, i.e., powered by commercial power supply, the determination is yes. Alternatively, if the control unit 302 of the NAN device 106 needs to autonomously and actively issue a notification of a service that the own device provides, the determination is yes. If power saving has higher priority than service detection, the determination is no. For example, if an application using some service is running on the NAN device 106, the control unit 302 of the NAN device 106 may determine to join a plurality of NAN clusters and issue a notification of the service. The determination may be made based on the type of service used by the application. For example, if an advertisement application is running, the control unit 302 may determine to join a plurality of NAN clusters and issue a notification to actively notify other NAN devices of an advertisement. On the other hand, if the wireless communication compliant with the Wi-Fi NAN standard is started based on power-on of the NAN device 106, the determination of the control unit 302 of the NAN device 106 may be no, so that a service notification is issued with saved power. The determination of the control unit 302 of the NAN device 106 may also be no if the OS settings of the NAN device 106 are changed and the wireless communication compliant with the Wi-Fi NAN standard is started. The determination may be made based on a user instruction. For example, if the NAN device 106 starting the wireless communication compliant with the Wi-Fi NAN standard is battery powered, the user is likely to expect the NAN device 106 to issue a service notification with saved power. The determination of the control unit 302 of the NAN device 106 in step S1001 is then no, and the control unit 302 selects the single cluster participation mode (power saving notification mode). On the other hand, if the NAN device 106 starting wireless communication compliant with the Wi-Fi NAN standard is non-battery powered, the user is likely to expect the NAN device 106 to actively issue a service notification. The determination of the control unit 302 of the NAN device 106 in step S1001 is then yes, and the control unit 302 selects the multiple cluster participation mode (active notification mode). Such selection examples are just examples. Which notification mode to select depending on how the wireless communication compliant with the Wi-Fi NAN standard is started is not limited thereto.

In step S1001, if the control unit 302 of the NAN device 106 determines to join a plurality of NAN clusters and issue a service notification (YES in step S1001), the processing proceeds to step S1002. In step S1002, the control unit 302 of the NAN device 106 determines whether the NAN device 106 can provide the service. For example, if there is an upper limit to the number of NAN devices for which the NAN device 106 can simultaneously provide the service, the control unit 302 of the NAN device 106 determines whether the number of NAN devices for which the service is already provided reaches the upper limit.

If the NAN device 106 is determined to be able to provide the service (YES in step S1002), the processing proceeds to step S1004. In step S1004, the control unit 302 of the NAN device 106 selects the multiple cluster participation mode. The flow of the present flowchart ends. On the other hand, in step S1001, if the control unit 302 of the NAN device 106 determines to issue a service notification without joining a plurality of NAN clusters (NO in step S1001), the processing proceeds to step S1003. If, in step S1002, the NAN device 106 is determined to be unable to provide the service (NO in step S1002), the processing proceeds to step S1003. In step S1003, the control unit 302 of the NAN device 106 selects the single cluster participation mode. The flow of the present flowchart ends.

If the single cluster participation mode is selected, the NAN device 106 detects and merges with a NAN cluster having a CG higher than that of the NAN cluster which the NAN device 106 joins. If the NAN device 106 informs the NAN cluster which the NAN device 106 has originally joined, of information about the new NAN cluster to join, the NAN device 106 may temporarily enter a state of joining two NAN clusters. Such a case is also covered by the single cluster participation mode of joining a single NAN cluster and issuing a service notification.

Figure 11:
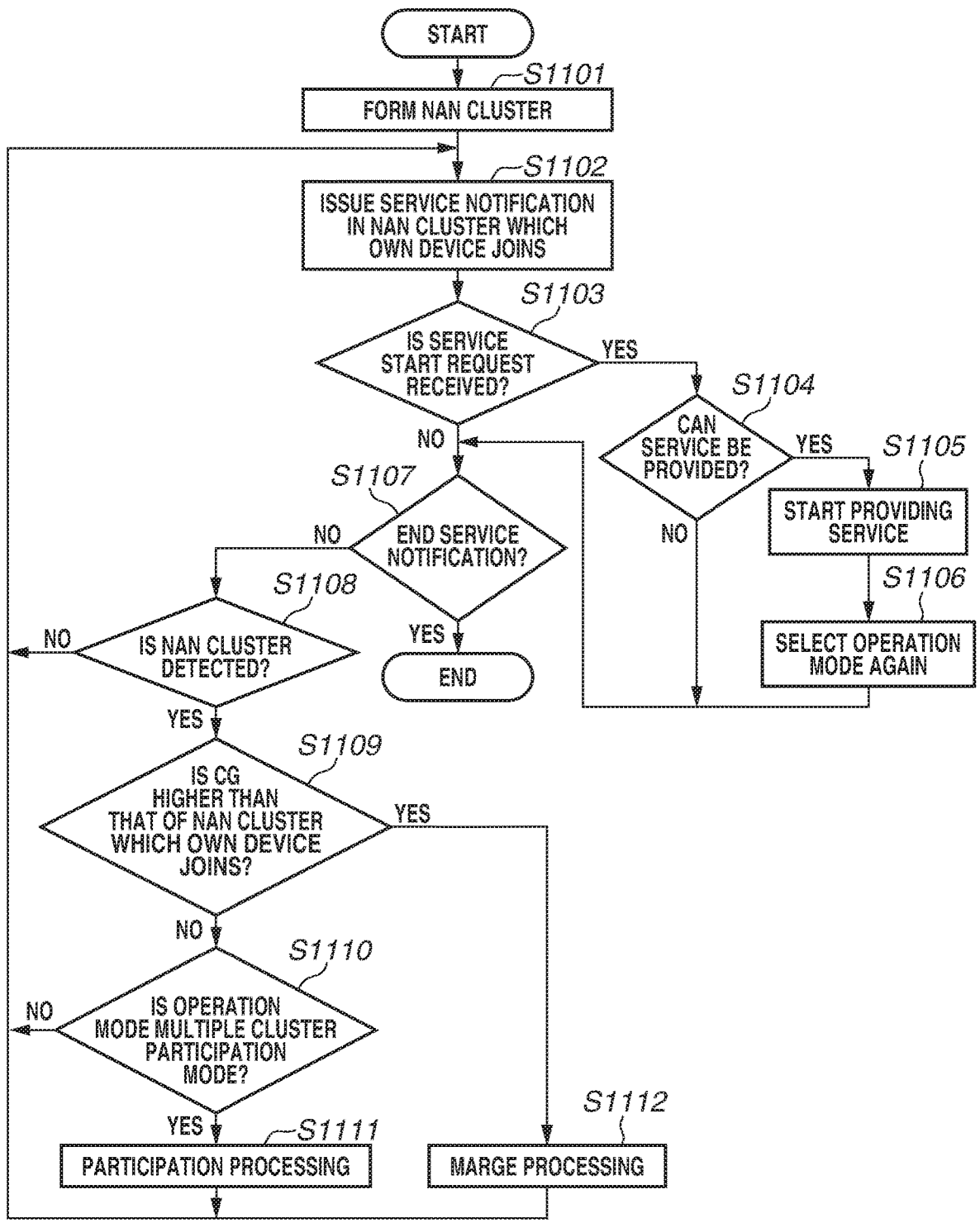
FIG. 11 is a flowchart illustrating processing performed based on whether a service can be provided when the NAN device forming a NAN cluster issues a service notification.

FIG. 11 is a flowchart illustrating processing implemented by the control unit 302 reading a program stored in the storage unit 301 and executing the program based on whether a service can be provided when the NAN device 106 forming a NAN cluster issues a service notification.

The flow of the present flowchart is started when the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flow of the flowchart in FIG. 10, the flow of the flowchart in FIG. 10 is started first. The flow of the present flowchart is started after that in FIG. 10 ends. Alternatively, the NAN device 106 may perform the processing of the flowcharts in FIGS. 10 and 11 in parallel.

The processing of steps S1101 to S1104 is similar to that of steps S501 to S504 in FIG. 5.

In step S1104, if the service for which the service start request is received from another NAN device is determined to be able to be provided (YES in step S1104), the processing proceeds to step S1105. In step S1105, the control unit 302 of the NAN device 106 starts providing the service. Specifically, the NAN device 106 starts providing the service for the NAN device transmitting the service start request, via the wireless communication compliant with the Wi-Fi standard. The NAN device 106 may start providing the service via wireless communication compliant with an IEEE 802.11 series standard other than the Wi-Fi NAN standard or via wireless communication compliant with another wireless communication method such as Bluetooth, UWB, or Zigbee. After the start of provision of the service, the processing proceeds to step S1106.

In step S1106, the control unit 302 of the NAN device 106 selects the operation mode again. Specifically, the control unit 302 starts the flow of the flowchart in FIG. 10, and selects the operation mode of the NAN device 106 again. The control unit 302 of the NAN device 106 may also select the operation mode again in determining whether the service can be provided in step S1104. After step S1106, the processing proceeds to step S1107.

In step S1104, if the service for which the service start request is received from another NAN device is determined to be unable to be provided (NO in step S1104), the processing proceeds to step S1107.

In step S1103, if no service start request is determined to be received from another NAN device (NO in step S1103), the processing proceeds to step S1107.

The processing of steps S1107 to S1112 is similar to that of steps S506 to S511 in FIG. 5, respectively.

In the present exemplary embodiment, the operation mode of the NAN device 106 is selected again, whereby a service notification is prevented from being issued to a new NAN cluster in a case where the NAN device 106 is unable to provide the service.

Figure 12:
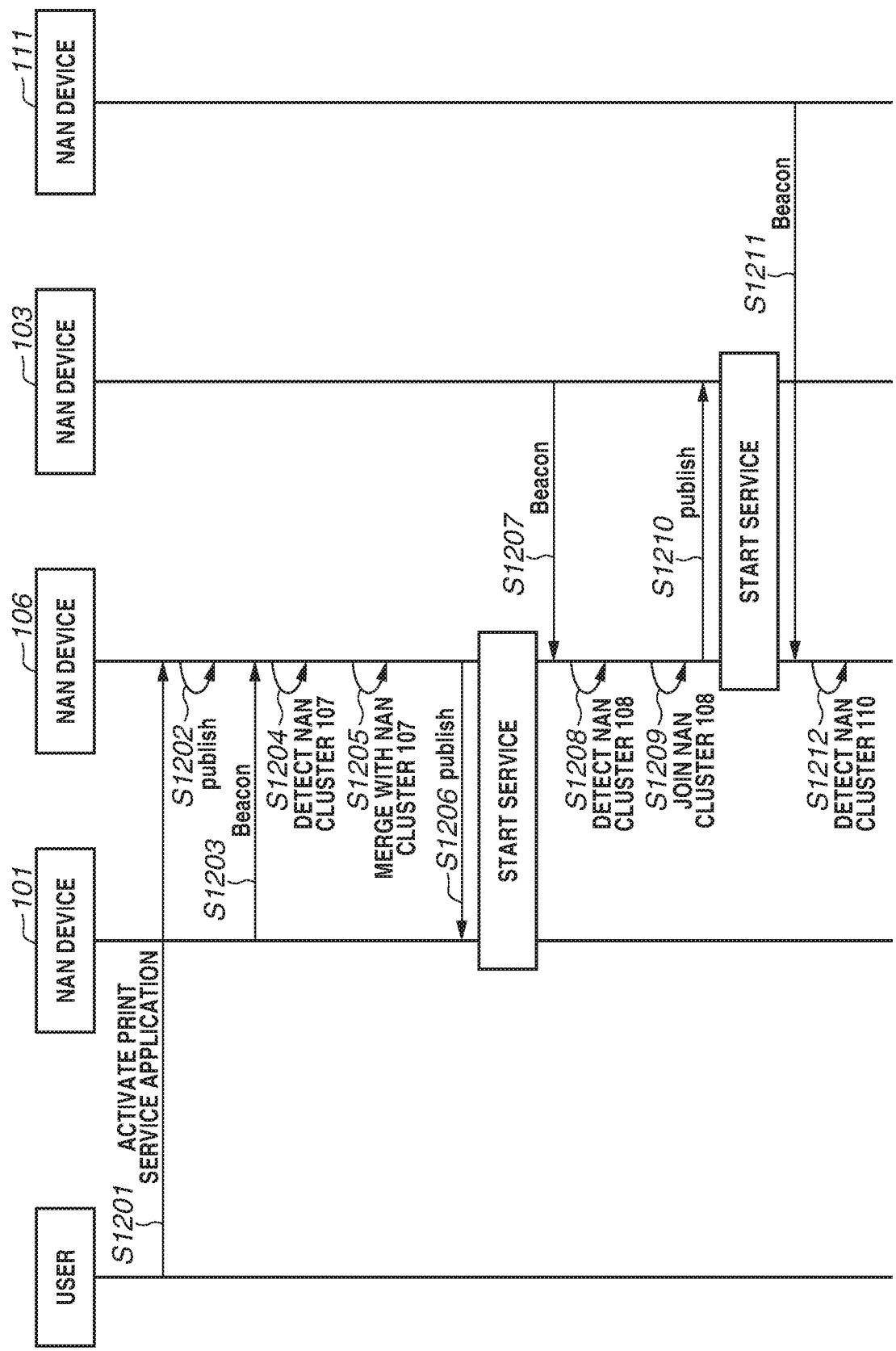
FIG. 12 is a sequence diagram illustrating processing performed based on whether a service can be provided when the NAN device issues a service notification in the multiple cluster participation mode.

FIG. 12 is a sequence diagram illustrating processing that the NAN device 106 performs based on whether a service can be provided, when the NAN device 106 issues a service notification in the multiple cluster participation mode.

A NAN device 111 is a NAN device joining a NAN cluster 110. The NAN cluster 110 has a CG lower than that of the NAN cluster 107. Suppose that the NAN devices 101, 103, and 111 are NAN devices searching for a print service.

In the present sequence, the NAN device 106 is assumed to be a non-battery powered printing apparatus. The NAN device 106 can simultaneously provide a print service for up to two other NAN devices.

The processing of steps S1201 to S1205 is similar to that of steps S601 to S605 in FIG. 6. Since the NAN device 106 is a non-battery powered NAN device and the number of other NAN devices for which the print service is provided has not reached the upper limit yet, the multiple cluster participation mode is selected as the operation mode of the NAN device 106.

In step S1206, the NAN device 106 joins the NAN cluster 107 and issues a service notification in the NAN cluster 107. Specifically, the NAN device 106 issue an unsolicited service notification to the NAN devices 101 and 102 joining the NAN cluster 107. The NAN device 106 notifies, by a Publish message, the NAN devices 101 and 102 joining the NAN cluster 107 that the NAN device 106 provides a print service.

In the present sequence, the NAN device 101 joining the NAN cluster 107 is a NAN device searching for a print service. The NAN device 101 receiving the Publish message transmitted from the NAN device 106 therefore requests the NAN device 106 to start a print service. Since the NAN device 106 can provide the print service, the NAN device 106 starts providing the print service for the NAN device 101. The NAN device 106 provides the print service for the NAN device 101 via wireless communication compliant with the Wi-Fi NAN standard. The NAN device 106 may start providing the print service via wireless communication compliant with an IEEE 802.11 series standard other than the Wi-Fi NAN standard or wireless communication compliant with another wireless communication method such as Bluetooth, UWB, or Zigbee.

Starting to provide the print service for the NAN device 101, the NAN device 106 selects the operation mode of the own device again. Since the NAN device 106 is a non-battery powered NAN device and the number of other NAN devices for which the print service is provided has not reached the upper limit yet, the multiple cluster participation mode is selected as the operation mode of the NAN device 106.

The NAN device 106 then waits for a NAN Discovery Beacon from other NAN clusters. In step S1207, the NAN device 106 receives a NAN Discovery Beacon from the NAN device 103 joining the NAN cluster 108. A NAN Synchronization Beacon may be received instead of a NAN Discovery Beacon.

In step S1208, the NAN device 106 detects the NAN cluster 108 by the reception of the NAN Discovery Beacon from the NAN device 103. Since the NAN cluster 108 has a CG lower than that of the NAN cluster 107, the NAN device 106 does not merge with the NAN cluster 108.

In step S1209, the NAN device 106 joins the NAN cluster 108 since the operation mode of the NAN device 106 is the multiple cluster participation mode.

In step S1210, the NAN device 106 joining the NAN cluster 108 issues a service notification in the NAN cluster 108. Specifically, the NAN device 106 issues an unsolicited service notification to the NAN devices 103, 104, and 105 joining the NAN cluster 108. The NAN device 106 notifies, by a Publish message, the NAN devices 103, 104, and 105 joining the NAN cluster 108 that the NAN device 106 provides a print service.

In the present sequence, the NAN device 103 joining the NAN cluster 108 is a NAN device searching for a print service. The NAN device 103 receiving the Publish message transmitted from the NAN device 106 therefore requests the NAN device 106 to start a print service. Since the NAN device 106 can provide the print service, the NAN device 106 starts providing the print service for the NAN device 103. The NAN device 106 provides the print service for the NAN device 103 via wireless communication compliant with the Wi-Fi NAN standard. The NAN device 106 may start to provide the print service via wireless communication compliant with an IEEE 802.11 series standard other than the Wi-Fi NAN standard or wireless communication compliant with another wireless communication method such as Bluetooth, UWB, or Zigbee.

Starting to provide the print service for the NAN device 103, the NAN device 106 selects the operation mode of the own device again. Although the NAN device 106 is a non-battery powered NAN device, the single cluster participation mode is selected as the operation mode of the NAN device 106 because the number of other NAN devices for which the print service is provided has reached the upper limit.

The NAN device 106 then waits for a NAN Discovery Beacon from other NAN clusters. In step S1211, the NAN device 106 receives a NAN Discovery Beacon from the NAN device 111 joining the NAN cluster 110. A NAN Synchronization Beacon may be received instead of a NAN Discovery Beacon.

In step S1212, the NAN device 106 detects the NAN cluster 110 by the reception of the NAN Discovery Beacon from the NAN device 111. Since the NAN cluster 110 has a CG lower than that of the NAN cluster 107, the NAN device 106 does not merge with the NAN cluster 110. Since the single cluster participation mode is selected as the operation mode of the NAN device 106, the NAN device 106 does not join the NAN cluster 110.

If the operation mode of the NAN device 106 is switched from the multiple cluster participation mode to the single cluster participation mode, the NAN device 106 may leave or not leave a NAN cluster or clusters having a CG lower than that of the NAN cluster which the own device joins.

In the present exemplary embodiment, if the NAN device 106 is in the multiple cluster participation mode, the NAN device 106 does not leave the NAN cluster which the NAN device 106 already joins when joining a new NAN cluster. However, if the NAN device 106 is operating in the multiple cluster participation mode and joins a predetermined number of NAN clusters or more, the NAN device 106 may leave any one of the NAN clusters which the NAN device 106 already joins when joining a new NAN cluster.

Figure 13:
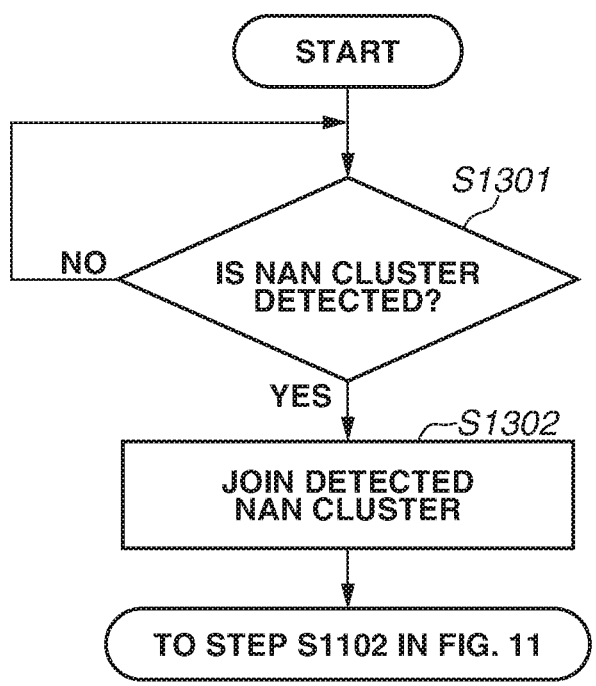
FIG. 13 is a flowchart illustrating processing performed based on whether a service can be provided when the NAN device issues a service notification.

FIG. 13 is a flowchart illustrating processing implemented by the control unit 302 reading a program stored in the storage unit 301 and executing the program based on whether a service can be provided when the NAN device 106 issues a service notification.

The flow of the present flowchart is started in a case where the NAN device 106 starts wireless communication compliant with the Wi-Fi NAN standard. The wireless communication compliant with the Wi-Fi NAN standard is started, for example, based on activation of the print service application of the NAN device 106. The service to be provided by the application activated here is not limited to a print service. The wireless communication compliant with the Wi-Fi NAN standard may be started based on a change in the OS settings of the NAN device 106. The wireless communication compliant with the Wi-Fi NAN standard may be started based on power-on of the NAN device 106. If the starting trigger is the same as that for the flow of the flowchart in FIG. 10, the flow of the flowchart in FIG. 10 is started first. The flow of the present flowchart is started after that in FIG. 10 ends. Alternatively, the NAN device 106 may perform the processing of the flowcharts in FIGS. 10 and 13 in parallel.

In step S1301, the control unit 302 of the NAN device 106 starts wireless communication compliant with the Wi-Fi NAN standard, and determines whether a NAN cluster is detected. The processing of this step is similar to that of step S1108. The NAN device 106 in the present flowchart does not form a NAN cluster when starting wireless communication compliant with the Wi-Fi NAN standard. The NAN device 106 in the present flowchart waits for a NAN Discovery Beacon transmitted from another NAN device joining a NAN cluster. The NAN device 106 may wait for a NAN Synchronization Beacon.

If no NAN cluster is determined to be detected (NO in step S1301), the processing returns to step S1301. On the other hand, if a NAN cluster is determined to be detected (YES in step S1301), the processing proceeds to step S1302. In step S1302, the control unit 302 of the NAN device 106 joins the NAN cluster detected in step S1301. If a plurality of NAN clusters is detected in step S1301, the NAN device 106 joins a NAN cluster having the highest CG. The NAN device 106 may join a NAN cluster first detected or a NAN cluster that is at a distance closest to the NAN device 106. The NAN cluster to be joined may be determined based on a user instruction. After the processing of step S1302, the control unit 302 of the NAN device 106 performs the processing of step S1102 and the subsequent steps in FIG. 11.

In the first and second exemplary embodiments, the NAN device 106 transmits and receives a Publish message and a Subscribe message during DWs. However, the NAN device 106 may transmit and receive such messages outside the DWs.

In the first and second exemplary embodiments, if the CG of the detected NAN cluster is higher than that of the NAN cluster which the own device joins, the NAN device 106 merges with the detected NAN cluster. In a case where the NAN device 106 merges with the detected NAN cluster, the NAN device 106 joins the detected NAN cluster and leaves the original NAN cluster. However, if the operation mode of the NAN device 106 is the multiple cluster participation mode, the NAN device 106 does not need to leave the original NAN cluster when merging with the detected NAN cluster.

In FIG. 9 of the first exemplary embodiment and FIG. 13 of the second exemplary embodiment, the NAN device 106 does not form a NAN cluster when starting wireless communication compliant with the Wi-Fi NAN standard. However, this is not restrictive. The NAN device 106 may form a NAN cluster if no NAN cluster can be detected for a predetermined time in step S901 or S1301. In such a case, the NAN device 106 in the flow in FIG. 9 starts the flow in FIG. 5. The NAN device 106 in the flow in FIG. 13 starts the flow in FIG. 11.

In the first and second exemplary embodiments, if the NAN device 106 is in the multiple cluster participation mode, the NAN device 106 does not leave the NAN cluster(s) which the NAN device 106 already joins when joining a new NAN cluster. However, if the NAN device 106 is operating in the multiple cluster participation mode and joins a predetermined number of NAN clusters or more, the NAN device 106 may leave any one of the NAN clusters which the NAN device 106 already joins when joining a new NAN cluster having a CG lower than those of the NAN clusters which the own device joins.

In the first and second exemplary embodiments, if the NAN device 106 is operating in the multiple cluster participation mode and joins a predetermined number of NAN clusters or more, the NAN device 106 does not need to increase the number of NAN clusters which the NAN device 106 joins. Specifically, suppose that the NAN device 106 joins a predetermined number of NAN clusters or more, and detects a new NAN cluster. If the detected NAN cluster has a CG higher than that of any of the NAN clusters which the NAN device 106 joins, the NAN device 106 merges with the detected NAN cluster. On the other hand, if the CG of the detected NAN cluster is lower than those of all the NAN clusters which the NAN device 106 joins, the NAN device 106 does not perform the participation processing.

In the first and second exemplary embodiments, if the NAN device 106 is operating in the multiple cluster participation mode and joins a plurality of NAN clusters, and each of the NAN clusters satisfies a predetermined condition, the role of the NAN device 106 may be changed. For example, if the NAN device 106 in a NAN cluster has the role of a Non-Master in a Non-Sync state and a predetermined condition is satisfied, the role of the NAN device 106 may be changed to a Master. The role of the NAN device 106 may be changed to a Non-Master in a Sync state. Similarly, if the NAN device 106 has the role of a Master or a Non-Master in a Sync state, the role of the NAN device 106 may also be changed. If the role of the NAN device 106 in a NAN cluster is changed from a Non-Master in a Non-Sync state to a Master, the NAN device 106 transmits a NAN Synchronization Beacon in the DW of the NAN cluster. The same applies if the role of the NAN device 106 is changed to a Non-Master in a Sync state.

In the first and second exemplary embodiments, if the NAN device 106 detects a NAN cluster, the NAN device 106 determines whether to issue a service notification in the detected NAN cluster based on the CG of the detected NAN cluster and the operation mode of the NAN device 106. However, this is not restrictive. If the NAN device 106 is operating in the multiple cluster participation mode, the NAN device 106 may issue a service notification in the detected NAN cluster regardless of the CG of the detected NAN cluster.

The first and second exemplary embodiments have been described by using a communication apparatus that performs communication compliant with the Wi-Fi NAN standard. However, the communication standard for the communication apparatus to comply with is not limited to the Wi-Fi NAN standard. The communication apparatus may be one capable of selecting a service notification method when a plurality of NWs compliant with an IEEE 802.11 series standard other than the Wi-Fi NAN standard is detected. The NWs to be detected by the communication apparatus may be ones compliant with wireless communication standards such as Bluetooth and Wireless USB.

Specifically, suppose that the communication apparatus detects, for example, a NW 1 in which the communication apparatus synchronously transmits and receives predetermined signals in a predetermined period and a NW 2 in which the communication apparatus synchronously transmits and receives predetermined signals in a period different from in NW 1. Suppose also that, in a NW which the communication apparatus joins, the communication apparatus can notify other communication apparatuses joining the NW of a service that the own device provides. In a case where the communication apparatus issues a service notification in a detected NW, the communication apparatus can select between a single NW participation mode in which a service notification is issued in a single NW and a multiple NW participation mode in which a service notification is issued in a plurality of NWs. If the communication apparatus is operating in the multiple NW participation mode and detects the NWs 1 and 2, the communication apparatus issues a service notification in both the NWs 1 and 2. On the other hand, if the communication apparatus is operating in the single NW participation mode, the communication apparatus compares predetermined values set for the respective detected NWs 1 and 2, and issues a service notification in either one of the NWs 1 and 2 based on the comparison result.

Suppose that, in a NW in which joining communication apparatuses synchronously transmit and receive a predetermined signal in a predetermined period, either the role of transmitting the predetermined signal or the role of not transmitting the predetermined signal is assigned to each communication apparatus joining the NW. Suppose also that the role of a communication apparatus is changed if a predetermined condition is satisfied. If a communication apparatus is operating in the multiple NW participation mode and joins a plurality of NWs, the role of the communication apparatus may be changed in each NW when a predetermined condition is satisfied.

At least part or all of the flowcharts of the NAN device 106 illustrated in FIGS. 4, 5, 9, 10, 11, and 13 may be implemented by hardware. In the case of hardware implementation, for example, a dedicated circuit can be formed and used on a field programmable gate array (FPGA) from a program for implementing respective steps by using a predetermined complier. A gate array circuit may be formed for hardware implementation as with an FPGA. An application specific integrated circuit (ASIC) may be used for implementation. The same applies to the sequence diagrams illustrated in FIGS. 6, 7, 8, and 12.

The steps of the flowcharts in FIGS. 4, 5, 9, 10, 11, and 13, and the sequence diagrams in FIGS. 6, 7, 8, and 12 may be performed by a not-illustrated plurality of CPUs or apparatuses in a distributed manner.

While the exemplary embodiments have been described in detail above, exemplary embodiments of the present disclosure may also be carried out in forms such as a system, an apparatus, a method, a program, and a recording medium (storage medium). Specifically, an exemplary embodiment of the present disclosure may be applied to a system including a plurality of devices (for example, a host computer, an interface device, an imaging apparatus, and a web application). An exemplary embodiment of the present disclosure may be applied to an apparatus including a single device.

An exemplary embodiment of the present disclosure can be achieved by processing for supplying a program for implementing one or more functions of the foregoing exemplary embodiments to a system or an apparatus via a NW or a storage medium, and reading and executing the program by one or more processors of a computer of the system or the apparatus. An exemplary embodiment of the present disclosure can also be implemented by a circuit (such as an ASIC) that implements one or more functions.

According to an exemplary embodiment of the present disclosure, a communication apparatus can be provided which, in a case where there is a plurality of NWs, can selectively issue a service notification in a single NW or in a plurality of NWs.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-211159, filed Oct. 31, 2017, which is hereby incorporated by reference herein in its entirety.

What is claimed is:

1. A communication apparatus comprising:
a participation unit configured to join a network in which a predetermine signal is communicated in a predetermined period synchronized by joining apparatuses;
a notification unit configured to notify a service that the communication apparatus provides in a network joined by the participation unit;
a detecting unit configured to detect a network in which the predetermine signal is communicated in a predetermined period synchronized by joining apparatus; and
a selection unit configured to select whether to perform, in a case where a second network with a second value is detected by the detecting unit while joining a first network with a first value greater than the second value by the participation unit, a notification of the service by the notification unit in the first network without joining the second network, or to join, in a case where the second network is detected by the detection unit while joining the first network by the participation unit, the second network by the participation unit and perform the notification of the service by the notification unit in the second network.

2. The communication apparatus according to claim 1, wherein
in a case where the selection unit selects to join the second network by the participation unit, the notification unit performs, in a case where the participation unit joins the second network, the notification of the service in the second network and the first network that maintains participation.

3. The communication apparatus according to claim 1, wherein the selection unit selects to join, in a case where a third network with a third value greater than the first value is detected while joining the first network, the third network by the participation unit with leaving the first network and perform the notification in the third network.

4. The communication apparatus according to claim 1, wherein the notification unit notifies the service by transmitting, to another communication apparatus joining the network joined by the participation unit, a notification signal including a notification of the service that the communication apparatus provides.

5. The communication apparatus according to claim 4, wherein the notification signal is a Publish message complied with a Wi-Fi Neighbor Awareness Network (NAN) standard.

6. The communication apparatus according to claim 4, wherein the notification unit transmits, in a case where the communication apparatus has received an inquiry signal for inquiring the service that the communication apparatus provides from another communication apparatus joining the network joined by the participation unit, the notification signal as a response to the inquiry signal.

7. The communication apparatus according to claim 6, wherein the inquiry signal is a Subscribe message complied with a Wi-Fi NAN standard.

8. The communication apparatus according to claim 1, wherein the detection unit is configured to detect the network by receiving an informing signal transmitted from another communication apparatus joining the network, the informing signal informing the communication apparatus of a presence of the network.

9. The communication apparatus according to claim 8, wherein the informing signal is a NAN Discovery Beacon complied with a Wi-Fi NAN standard.

10. The communication apparatus according to claim 8, wherein the detection unit is configured to detect the network by receiving a synchronization signal transmitted from another communication apparatus joining the network, the synchronization signal used for synchronization of the predetermined period in the network.

11. The communication apparatus according to claim 10, wherein the synchronization signal is a NAN Synchronization Beacon complied with a Wi-Fi NAN standard.

12. The communication apparatus according to claim 1, wherein the selection unit is configured to select based on whether the communication apparatus is battery powered.

13. The communication apparatus according to claim 1, wherein the selection unit is configured to select based on whether the communication apparatus can provide the service.

14. The communication apparatus according to claim 1, wherein a first predetermined period synchronized in the first network is a period different from a second predetermined period synchronized in the second network.

15. The communication apparatus according to claim 14, wherein the predetermined period is Discovery Windows (DW) complied with a Wi-Fi NAN standard.

16. The communication apparatus according to claim 1, wherein the network joined by the participation unit is a NAN cluster complied with a Wi-Fi NAN standard.

17. The communication apparatus according to claim 1, wherein the first value and the second value each are a Cluster Grade (CG) complied with a Wi-Fi NAN standard.

18. The communication apparatus according to claim 1, wherein the predetermined signal is a NAN Synchronization Beacon complied with a Wi-Fi NAN standard.

19. A method for controlling a communication apparatus, the method comprising:
joining a network in which a predetermine signal is communicated in a predetermined period synchronized by joining apparatuses;
notifying a service that the communication apparatus provides in a network joined by the joining;
detecting a network in which the predetermine signal is communicated in a predetermined period synchronized by a joining apparatus; and
selecting whether to perform, in a case where a second network with a second value is detected by the detecting while joining a first network with a first value greater than the second value by the joining, a notification of the service by the notifying in the first network without joining the second network, or to join, in a case where the second network is detected by the detecting while joining the first network by the joining, the second network by the joining and performing the notification of the service by the notifying in the second network.

20. A non-transitory computer-readable recording medium on which a program for causing a computer to function as each unit of a communication apparatus is recorded, the program causing the computer to perform:
joining a network in which a predetermine signal is communicated in a predetermined period synchronized by joining apparatuses;
notifying a service that the communication apparatus provides in a network joined by the joining;
detecting a network in which the predetermine signal is communicated in a predetermined period synchronized by a joining apparatus; and
selecting whether to perform, in a case where a second network with a second value is detected by the detecting while joining a first network with a first value greater than the second value by the joining, a notification of the service by the notifying in the first network without joining the second network, or to join, in a case where the second network is detected by the detecting while joining the first network by joining, the second network by joining and perform the notification of the service by the notifying in the second network.

* * * * *